(12) United States Patent
Lee

(10) Patent No.: US 8,583,118 B2
(45) Date of Patent: Nov. 12, 2013

(54) MOBILITY MANAGEMENT CONTROL TECHNIQUE AND MOBILE COMMUNICATIONS SYSTEM

(75) Inventor: Jinsock Lee, Tokyo (JP)

(73) Assignee: NEC Corporation, Tokyo (JP)

(*) Notice: Subject to any disclaimer, the term of this patent is extended or adjusted under 35 U.S.C. 154(b) by 838 days.

(21) Appl. No.: 11/717,161

(22) Filed: Mar. 13, 2007

(65) Prior Publication Data

US 2007/0218905 A1  Sep. 20, 2007

(30) Foreign Application Priority Data

Mar. 16, 2006 (JP) ................................. 2006-072042

(51) Int. Cl.
*H04W 36/00* (2009.01)
(52) U.S. Cl.
USPC ........ 455/436; 455/456.5; 455/453; 455/458; 455/445; 370/338
(58) Field of Classification Search
USPC ...................................... 455/456.5, 453, 458
See application file for complete search history.

(56) References Cited

U.S. PATENT DOCUMENTS

| | | | |
|---|---|---|---|
| 6,317,600 B1 * | 11/2001 | Salonaho et al. ............. | 455/453 |
| 6,553,227 B1 | 4/2003 | Ho et al. | |
| 6,944,463 B2 * | 9/2005 | Gunreben et al. ............ | 455/453 |
| 6,968,196 B1 * | 11/2005 | Back et al. .................. | 455/456.5 |
| 7,197,319 B2 * | 3/2007 | Tiedemann et al. .......... | 455/453 |
| 2001/0012778 A1 * | 8/2001 | Eriksson et al. ............. | 455/436 |
| 2004/0063402 A1 | 4/2004 | Takeda et al. | |
| 2004/0105416 A1 * | 6/2004 | Rue ............................... | 370/338 |
| 2006/0058044 A1 * | 3/2006 | Horvath et al. ............ | 455/456.5 |
| 2006/0128394 A1 * | 6/2006 | Turina et al. .................. | 455/453 |
| 2006/0142021 A1 * | 6/2006 | Mueckenheim et al. ..... | 455/453 |

FOREIGN PATENT DOCUMENTS

| | | |
|---|---|---|
| CN | 1738477 | 2/2006 |
| EP | 1 592 275 | 11/2005 |
| EP | 1 715 715 | 10/2006 |
| KR | 2004-0048255 | 6/2004 |
| WO | 2006/065198 | 6/2006 |

OTHER PUBLICATIONS

3GPP TR 23.822 V0.10.0 (Jan. 2006)—NPL Provided by Applicant.*
3rd Generation Partnership Project; Technical Specification Group Services and System Aspects; 3 GPP System Architecture Evolution: Report on Technical Options and Conclusion (Release 7) Jan. 2001 Document No. 3GPP TR 23.882 vo.10.0 (Jan. 2006).
Korean Patent Office issued a Korean Office Action dated Jun. 22, 2009, Application No. 2007-0025381.

(Continued)

*Primary Examiner* — David Q Nguyen
(74) *Attorney, Agent, or Firm* — Young & Thompson

(57) ABSTRACT

A mobility management control method and system that can redress the uneven loads on base stations in a mobile communications network are provided. Multiple base stations in a tracking area each have a mobile station mobility management function. A base station positioned at an edge of the tracking area monitors its own load state. Depending on its own load state, the base station relocates to another base station a location management function with respect to a new location management request, or a location management function as a mobility management serving base station with which location management has been already performed for a mobile station.

35 Claims, 14 Drawing Sheets

(56) References Cited

OTHER PUBLICATIONS

Chinese Office Action for Application No. 200710088217.2, Date Issued on Feb. 24, 2011.
European Search Report—EP 07 00 5400—Feb. 9, 2011.
NTT Docomo et al.—"Load balancing solutions for LTE", 3GPP Draft; R2-070779, 3rd Generation Partnership Project (3GPP)., Mobile Competence Centre; 650, Route Des Lucioles; F-06921 Sophia-Antipolis Cedex; Franc, No. TDOC-R2-070779, Feb. 12, 2007, pp. 1-5, XP002492679.
Samsung: "Discussion on configuration of 1-35 tracking area", 3GPP Draft; R3-060148, 3rd Generation Partnership Project (3GPP), Mobile Competence Centre; 650, Route Des Lucioles; F-06921 Sophia-Antipolis Cedex; France, vol. RAN WG3, No. Denver, USA; Feb. 9, 2006, XP050159109, [retrieved on Feb. 6, 2006].

* cited by examiner

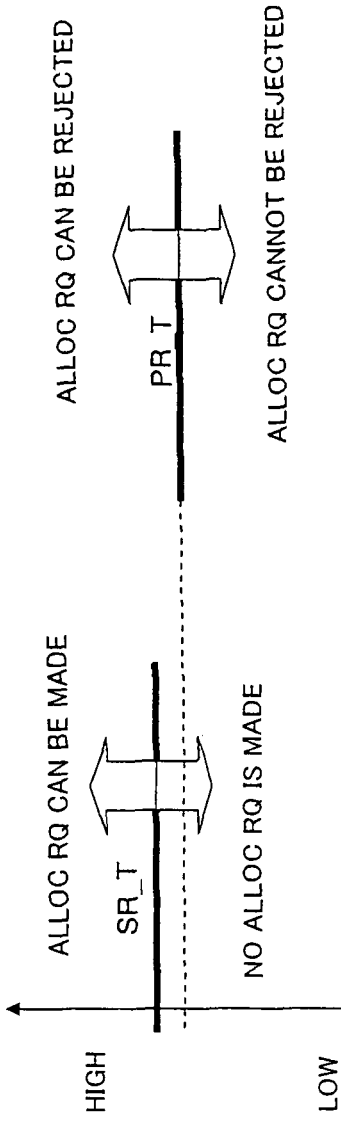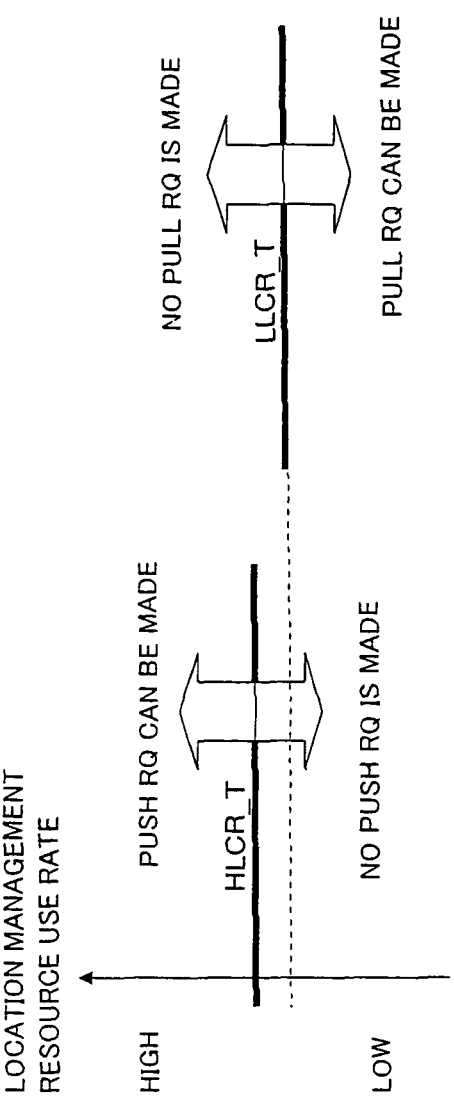

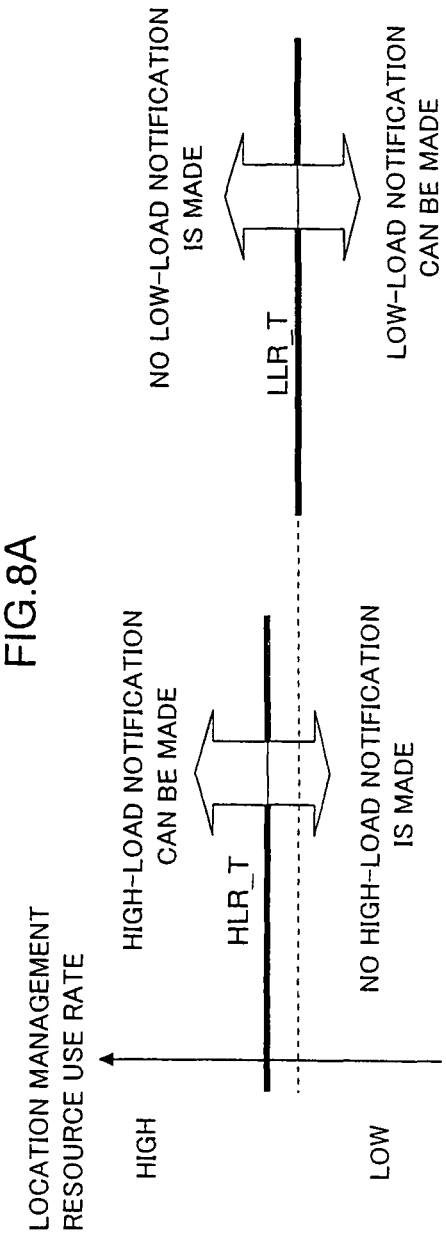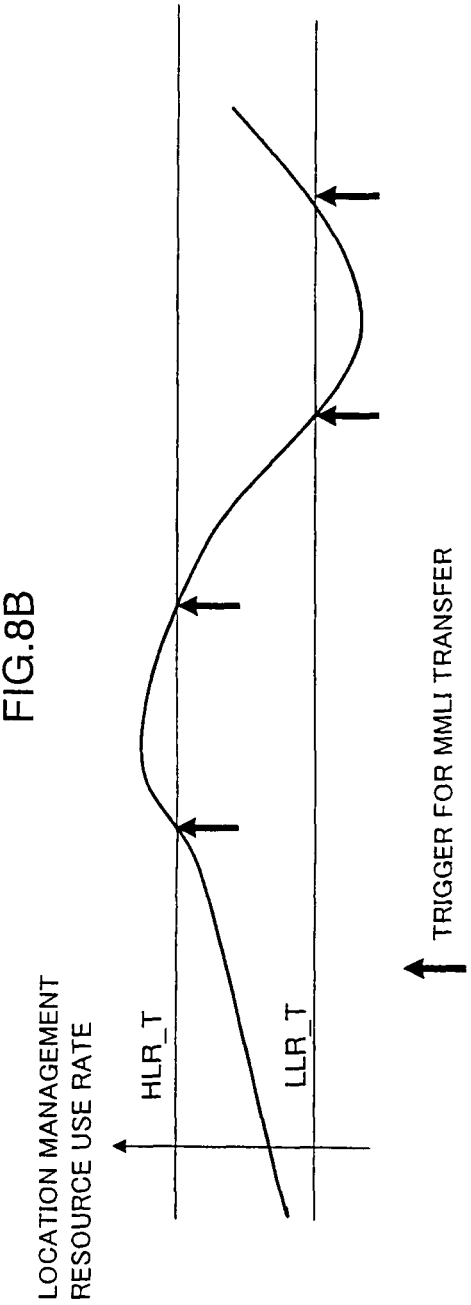

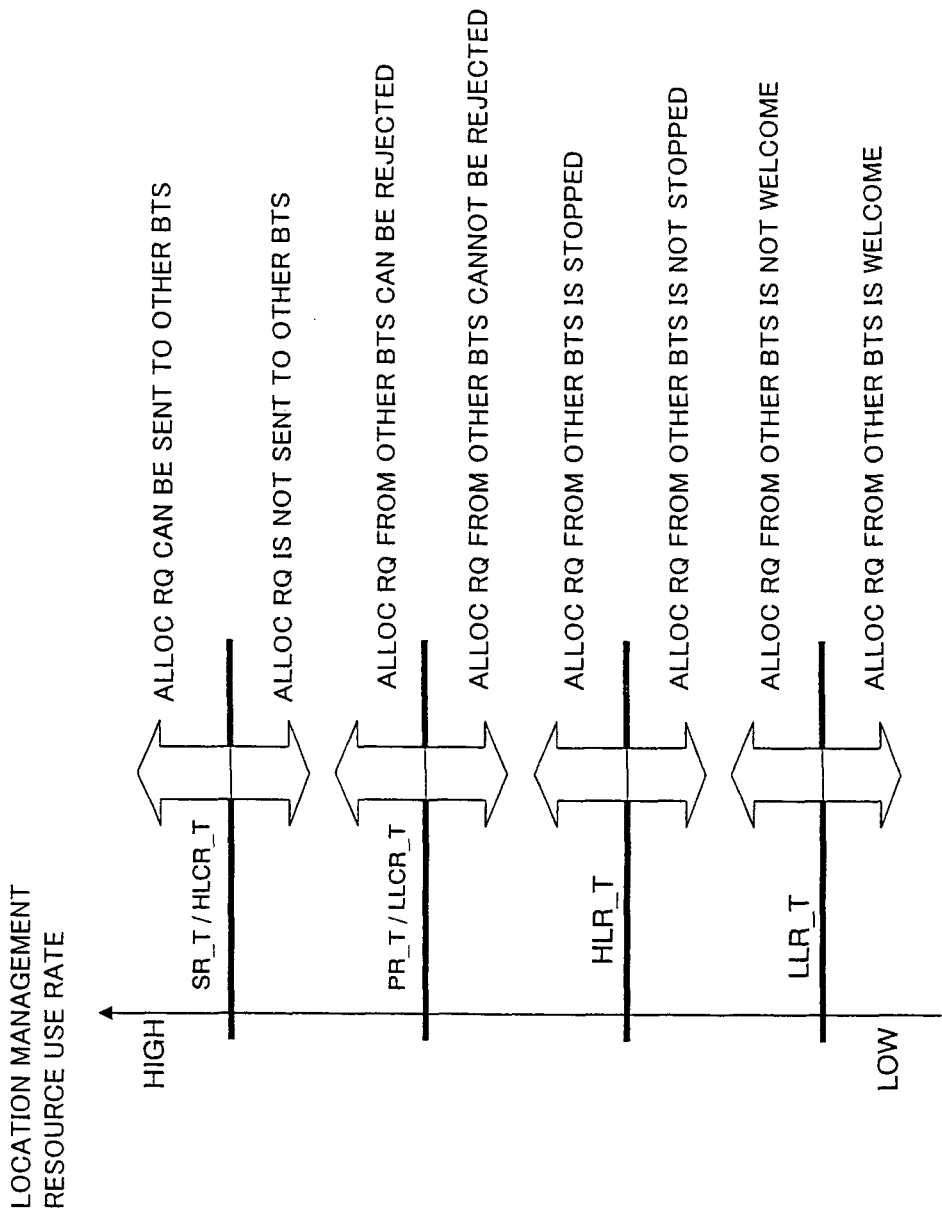

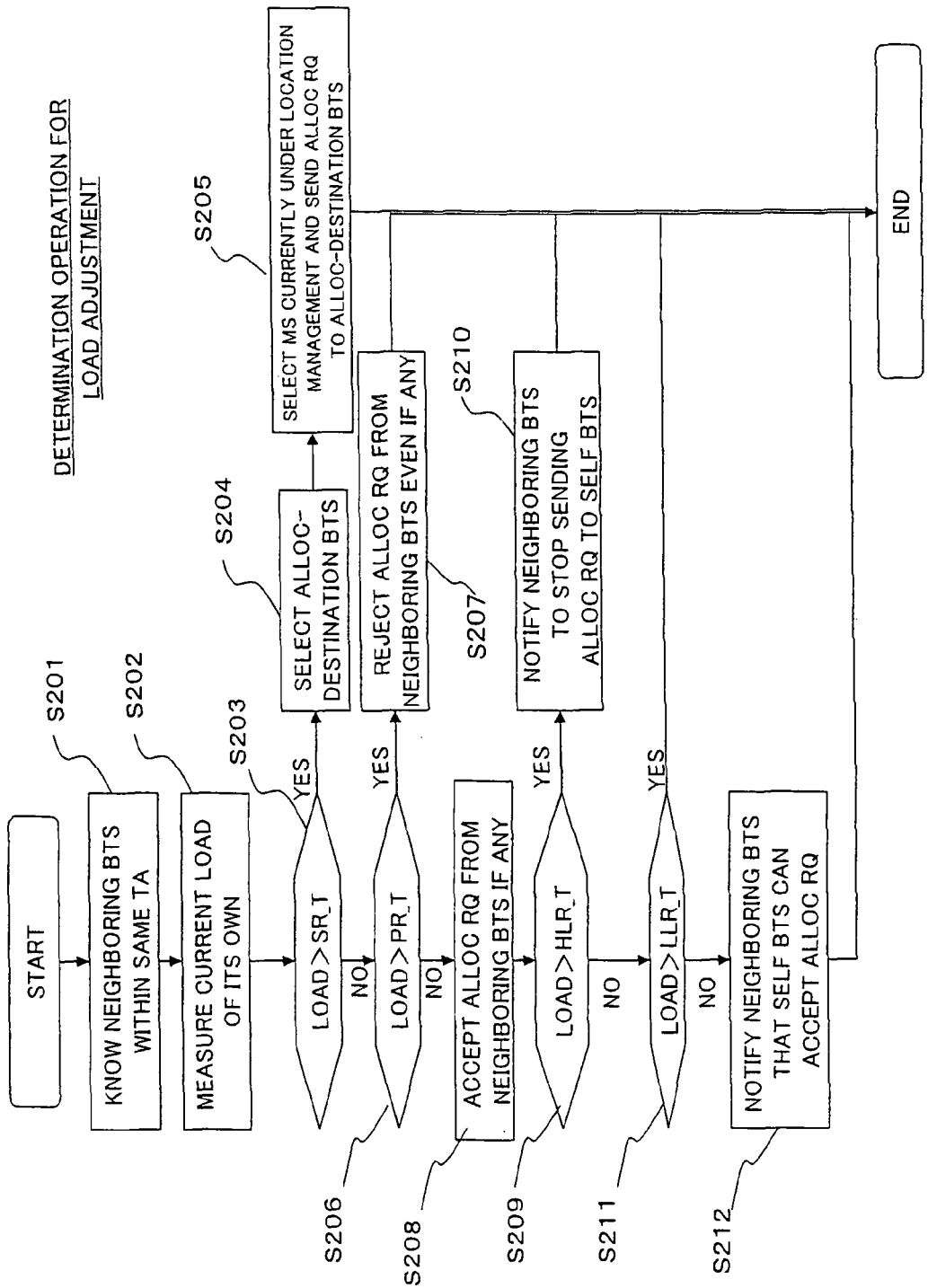

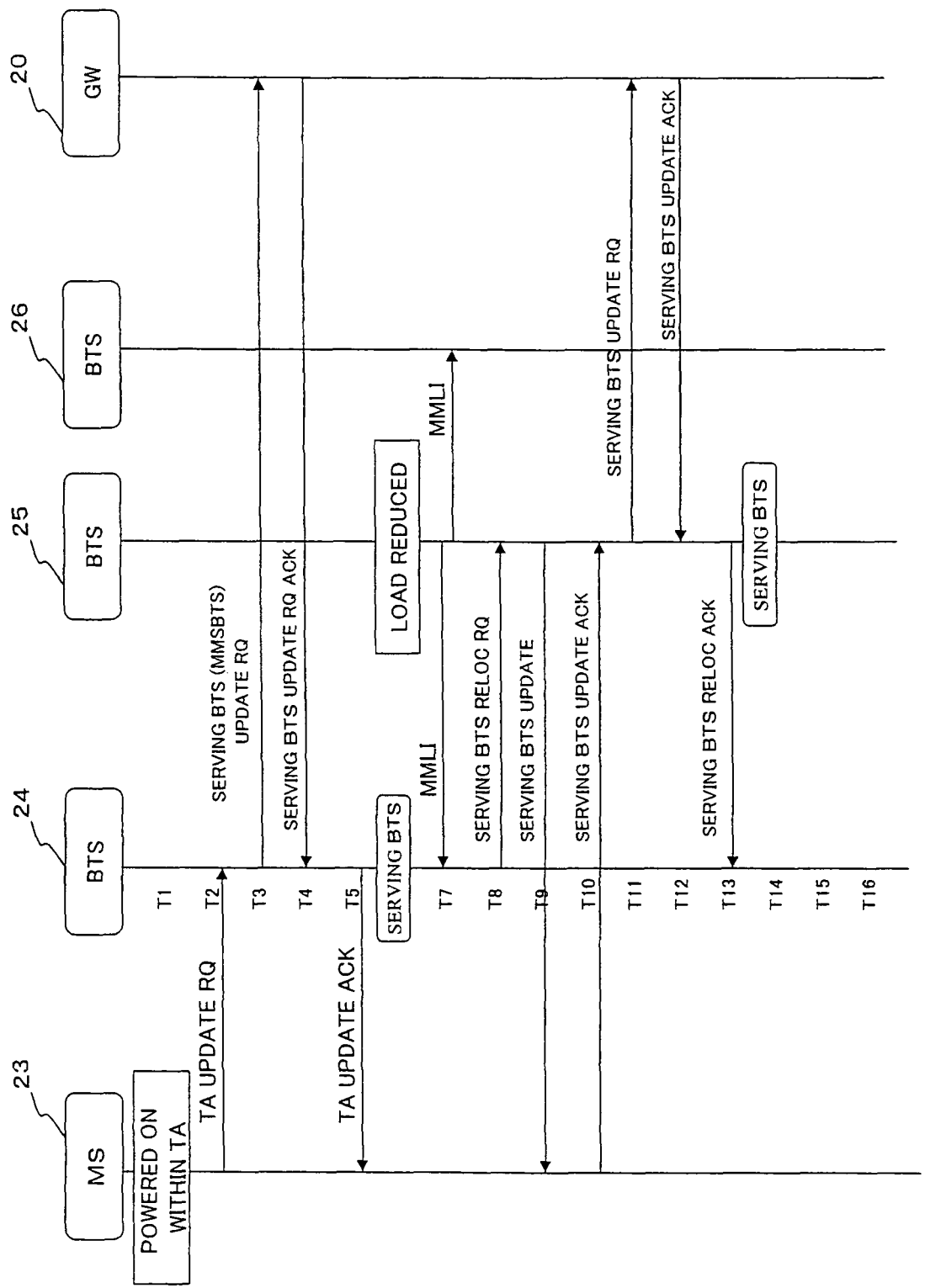

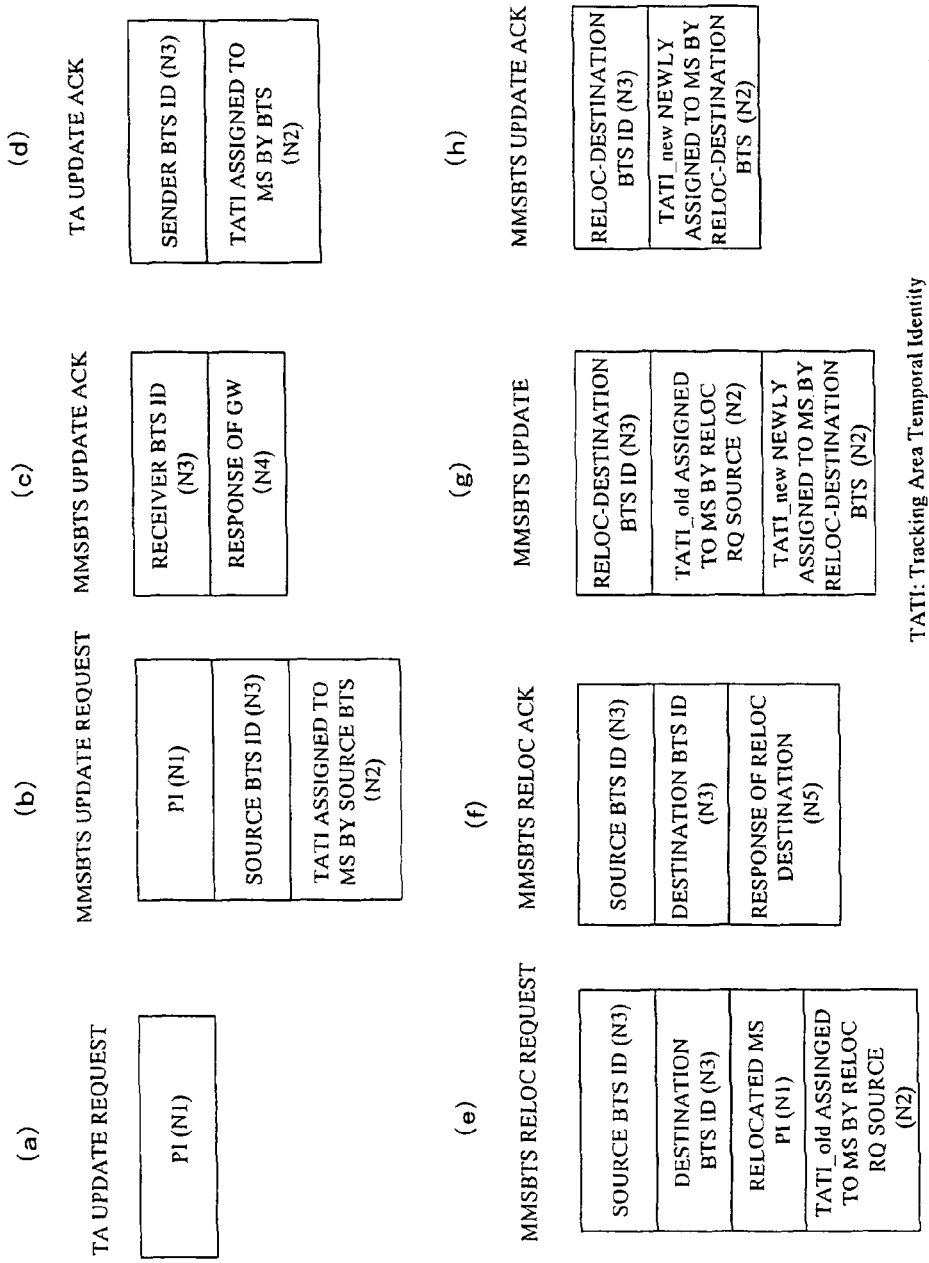

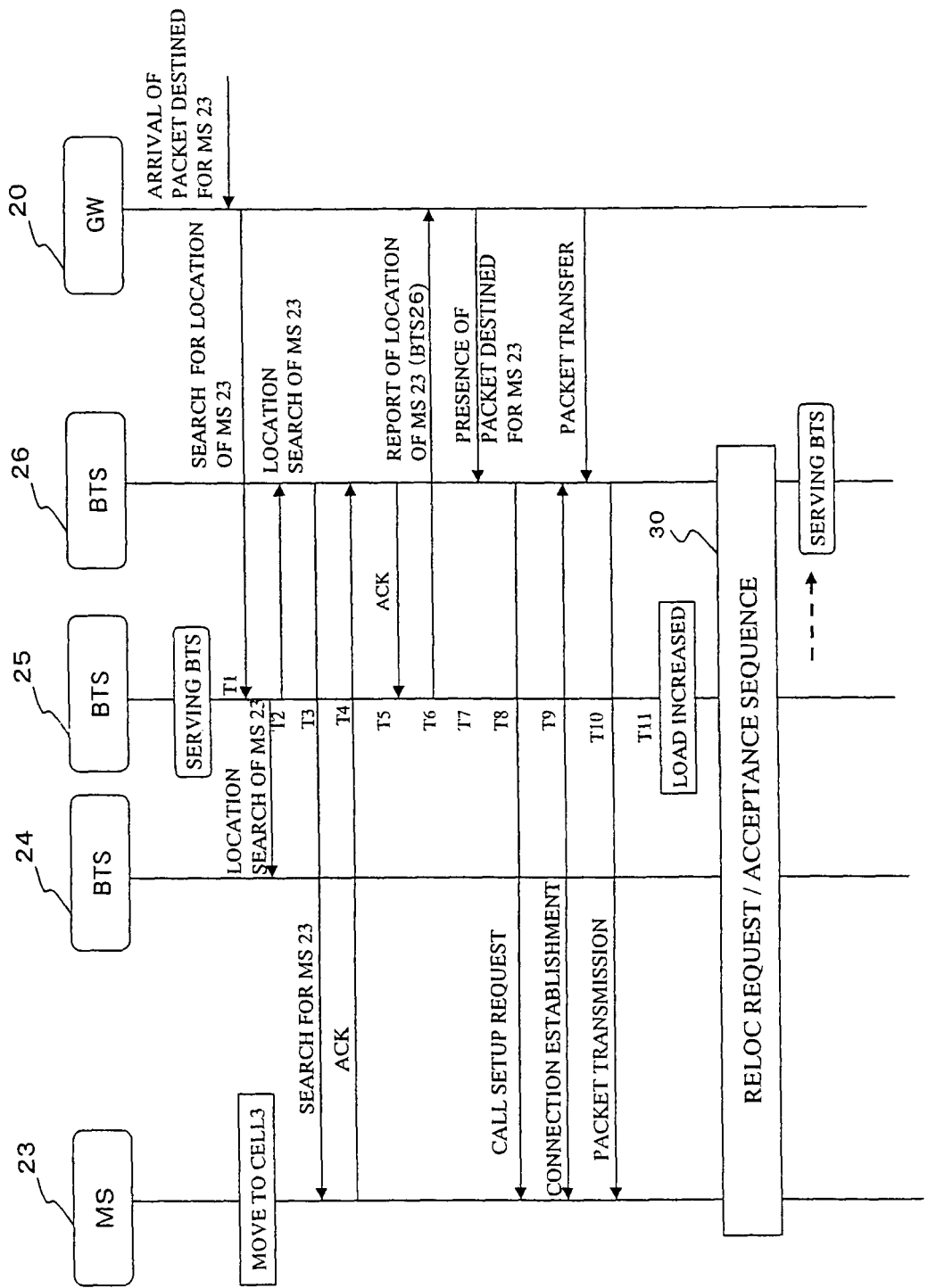

MOBILITY MANAGEMENT CONTROL TECHNIQUE AND MOBILE COMMUNICATIONS SYSTEM

BACKGROUND OF THE INVENTION

1. Field of the Invention

The present invention relates to a mobile communications system and, more particularly, to a method and system for controlling mobility management in a mobile communications system, as well as to a base station in the mobile communications system.

2. Description of the Related Art

A mobile communications network in general is provided with a function called mobility management (MM) for managing the location of a mobile station (or UE: User Equipment), with which it is possible to track the location of a mobile station and to page the mobile station even if the mobile station is in an idle state of not carrying out communication. The tracking of the location of a mobile station is performed in at an area granularity composed of a plurality of cells, which is called a location management area or tracking area (hereinafter, abbreviated as "TA" where appropriate). Location management is performed in such a manner that a mobile station is assigned a temporary unique number (temporary identity) in a tracking area in which the mobile station is currently registered. When the mobile station moves to another tracking area, the location management of the mobile station is performed using a temporary identity that is assigned to the mobile station in that new tracking area (see 3GPP TR 23.822 V0.10.0 (2006-01), Technical Report, pp. 29-33).

FIG. 1 is a schematic diagram of a conventional mobile communications system. Here, to avoid complexity, it is assumed that a tracking area 7 is composed of cells 4 to 6, which are covered by three base stations (BTS) 1 to 3 respectively, and that a tracking area 10 is composed of a cell 9, which is covered by a base station 8. These base stations 1 to 3 and 8 can communicate with each other by connecting to a router 11 through transmission paths Xub1 to Xub4 respectively and, via the router 11, are further connected to a BTS controller 12 and a gateway (GW) 13.

In such a conventional system, a mobility management entity MME exists in a central controller such as the gateway 13 or BTS controller 12 and performs location management such as assigning a temporary identity to a mobile station. For example, as shown in FIG. 1, when a mobile station 14 has moved from the tracking area 10 into the tracking area 7, the mobile station 14 knows from a broadcast signal received from the base station 1 that the mobile station 14 has come into the new tracking area 7. Upon knowing of this, the mobile station 14 sends an area update request to the base station 1 and is assigned a temporary identity by the gateway 13 so that location management is carried out in the tracking area 7. The mobility management for the mobile station 14 is performed by the gateway 13 through the base station 1 to which the area update request is first sent. When the mobile station 14 is in idle mode, it periodically searches for a best radio cell to camp on. Such a best radio cell is often called as "camped cell" and the base station controlling the "camped cell" is noted as "camped base station".

For example, when a packet destined for the mobile station 14 arrives at the gateway 13 from the Internet 15, the gateway 13 inquires of all the base stations in the tracking area 7 where the mobile station 14 is located. Thereby, it is found which base station currently accommodates the mobile station 14, and the gateway 13 can transfer the packet destined for the mobile station 14 to that base station.

In the above-described conventional system, the mobility management entity MME exists in the central controller such as the gateway or BTS controller. However, it is also possible to equip each of the plurality of base stations with the same mobility management function. In general, there is a trend to relocate management functions, such as the mobility management function, from a central controller to an end base station.

However, in a mobility management system in which each base station is provided with the mobility management function, the loads of mobility management processing are uneven among the base stations. A base station that is installed near the boundary of a tracking area in particular will accept location management requests from terminals newly coming into the tracking area, and therefore the problem arises that the load on this base station might be larger than those on other base stations.

FIG. 2 is a schematic diagram showing an example in which an excessive load state occurs in a distributed mobility management system. It is assumed that each base station in a tracking area TA is provided with a mobility management function and that a base station BTS1 is installed near the boundary of the tracking area TA. If a large number of mobile stations come into the tracking area TA at a time by, for example, being transported by train, the base station BTS1 will have to process new area update requests from these many mobile stations. In this case, the following two problems may arise.

1) The first problem is that the temporary identities (unique numbers) may be depleted that are to be assigned individually to the mobile stations by the base station BTS1 positioned near the tracking area boundary. In general, the number of temporary identities for mobile station identification assigned within the tracking area TA is predetermined, and this predetermined number of temporary identities is allocated among the base stations in the tracking area TA evenly, or depending on the circumstance of each base station. Therefore, the number of temporary identities for mobile station identification allotted to the base station BTS1 is finite. Accordingly, if a large number of mobile stations send new area update requests at a time, the possibility increases that the temporary identities to be assigned to these mobile stations are depleted. If a mobile station is not assigned a temporary identity, this mobile station cannot be identified in this tracking area TA, resulting in location management being impossible. As a matter of course, when a packet destined for this mobile station arrives at a gateway GW, the packet cannot be transferred to this mobile station.

2) The second problem is that a new location management request cannot be processed because of the increased amount of processing in the base station BTS1 positioned near the tracking area boundary. As mentioned above, the base station BTS1 serves the large number of mobile stations as their respective serving base stations and has to transmit and receive control signals for location management to/from the gateway GW. Therefore, the amount of processing in the base station BTS1 tends to increase with the passage of time, and when the amount of processing reaches the limit of the throughput of the base station BTS1, the base station BTS1 cannot deal with a new area update request. Additionally, as the amount of processing in the base station BTS1 increases, the rate of use of a transmission path Xub1 that connects the base station BTS1 and a router also rises and may come close to the upper limit of the capacity. As a result, the possibility is high that the tracking of the location of a mobile station as described above becomes impossible, leading to a disconnection of communication with this mobile station.

FIG. 3 is a sequence diagram showing an example of a process of disconnecting communication with a mobile station in a conventional mobility management method. The mobile station 14 first receives TA information from the base station 8 in the tracking area 10 (time T1) and, in response to this, makes a TA update request (time T2). The base station 8 sends a serving BTS (MMSBTS) update request to the gateway 13 (time T3) and, when receiving an update ACK response to this request from the gateway 13 (time T4), sends a TA update ACK response to the mobile station 14 (time T5). Hereinafter, consideration will be given of the case where the mobile station 14 registered in the tracking area 10 as described above has moved into the cell 4 of the base station 1 installed near the boundary of the tracking area 7.

Here, it is assumed that the base station 1 is short of temporary identities for mobile station identification, or the amount of processing in the base station 1 has reached the upper limit of the throughput (i.e., the base station 1 is short of a location management resource). In such a situation, when the mobile station 14 has moved into the cell 4, the mobile station 14 first receives TA information from the base station 1 in the tracking area 7 (time T9). In response to this, the mobile station 14 sends a TA updated request (time T10). However, the base station 1 is not able to accept the TA update request from the mobile station 14 and therefore sends back a TA update NACK response (time T11). Accordingly, the mobile station 14 remains area-registered with the base station 8 in the tracking area 10 although the mobile station 14 is already in the cell 4. In this state, when a packet destined for the mobile station 14 arrives at the gateway 13 (time T7), the gateway 13 inquires of the serving base station 8 of the mobile station 14, about where the mobile station 14 is located (location search, time T8). However, the base station 8 cannot find the mobile station 14 because the mobile station 14 has already left the tracking area 10. If the base station 8 cannot find the destination (mobile station 14) even when a predetermined period of time has passed, the base station 8 responds to the gateway 13 with a NACK response to the location search request (time T11). Accordingly, the gateway 13 discards the packet destined for the mobile station 14.

As described above, the fact that a large processing load is imposed on one particular base station in a tracking area is a great factor for the inability to track a mobile station and for a disconnection of communication with the mobile station. In addition, the fact that the loads are uneven between a base station installed near a tracking area boundary and another base station not installed near the tracking area boundary means that some base stations are short of the finite number of allocated temporary identities and some base stations have a surplus. Accordingly, as a whole, the temporary identities cannot be used efficiently.

Incidentally, like the bandwidth of a transmission line and the like, the temporary identities for mobile station identification provided to a base station and the throughput of a base station can be thought of as shared resources for the mobility management of a plurality of mobile stations and the communications thereof. Therefore, hereinafter, the temporary identities for mobile station identification and the throughput of a base station will be referred to as "location management resources", and the rate of use of any of these resources will be referred to as "location management resource use rate" or "load" as appropriate.

SUMMARY OF THE INVENTION

The present invention has been made to solve the above-described problems. An object of the present invention is to provide a mobility management control method and system that redress the uneven imposition of load on a particular base station in a mobile communications network.

Another object of the present invention is to provide a mobile communications system, as well as a mobility management method and system used in the mobile communications system, which can enhance the use of shared network resource in a mobile communications network and can reduce the number of mobile stations disconnected from communication.

A mobility management control method according to the present invention is performed by: at each of the plurality of base stations, monitoring its load state; and determining whether a mobility management function of performing location management of a mobile station is transferred from a single base station to another base station, depending on load state of at least one base station.

According to a first aspect of the present invention, each of the plurality of base stations monitors its load state and, when receiving the location management request from a mobile station, the base station, looking at its own load state, may determine whether the mobility management function related to the location management request from the mobile station is allocated to another base station, depending on its own load state. In addition, after starting the location management for the mobile station, the base station may determine whether the mobility management of the mobile station is relocated to another base station, depending on its own load state.

According to a second aspect of the present invention, each of a plurality of base stations is provided with a mobile management function for mobile stations, wherein each base station monitors its load state. by collecting respective load states from the plurality of base stations, it is determined whether the mobility management function for at least one mobile station is transferred to another base station, depending on the load state of at least one base station.

A base station according to the present invention includes: a mobile manager performing mobile management of mobile stations; a load detector for detecting load state of the base station; and a determination section for determining whether a mobility management function of performing location management of a mobile station is transferred to another base station, depending on the load state of the base station.

A mobile communications system according to the present invention includes at least one mobile station and a plurality of base stations, wherein each of the plurality of base stations has a monitor for monitoring its load state, and further includes a determination section for determining whether a mobility management function of performing location management of a mobile station is transferred from a single base station to another base station, depending on load state of at least one base station.

As described above, according to the present invention, it is determined whether the mobile management related to a mobile station is transferred from a base station to another base station, depending on load state of base stations. Accordingly, when there is developed an uneven load state among base stations, the mobile management is transferred from a base station with high-load state to another base station with low-load state so as to cancel such uneven load state. For example, when a base station detects such uneven load state between the base station and another base station, the mobile management can be transferred between these base stations in such a direction that the difference in load between them is reduced.

Further, resolving the uneven load state of the mobile management among base stations can reduce uneven use rates of communication lines, allowing new acceptance of an increased number of mobile stations, which results in maximized network capacity for each area. specifically, in a mobile communications system which performs the mobile management of mobile stations for each of mobile management areas (tracking areas) under which a plurality of base stations are divided, the area registration request and the location management processing trend to center on a base station installed near mobile management area boundary. According to the present invention, such uneven amount of processing can be effectively removed.

BRIEF DESCRIPTION OF THE DRAWINGS

FIG. 6 shows the settings of threshold values related to an allocation request as to the load on a base station and related to an allocation request rejection.

FIG. 7 shows the settings of threshold values related to relocation requests as to the load on a base station.

FIG. 8A shows the settings of threshold values related to high-load and low-load notifications as to the load on a base station.

FIG. 8B is a diagram for describing the timings of performing the high-load and low-load notifications.

FIG. 9 shows the settings of threshold values related to an allocation request as to the load on a base station, an allocation rejection, an allocation stop, and an allocation welcome.

FIG. 10 is a flowchart showing determination operation of a base station for load adjustment, according to the present mode.

FIG. 11 is a sequence diagram showing a mobility management control method according to a first embodiment of the present invention.

FIG. 12 schematically shows pieces of information contained in signals used in the sequence of FIG. 11.

FIG. 15 is a sequence diagram showing a mobility management method according to a third embodiment of the present invention.

DETAILED DESCRIPTION OF THE PREFERRED EMBODIMENTS

Figure 1:
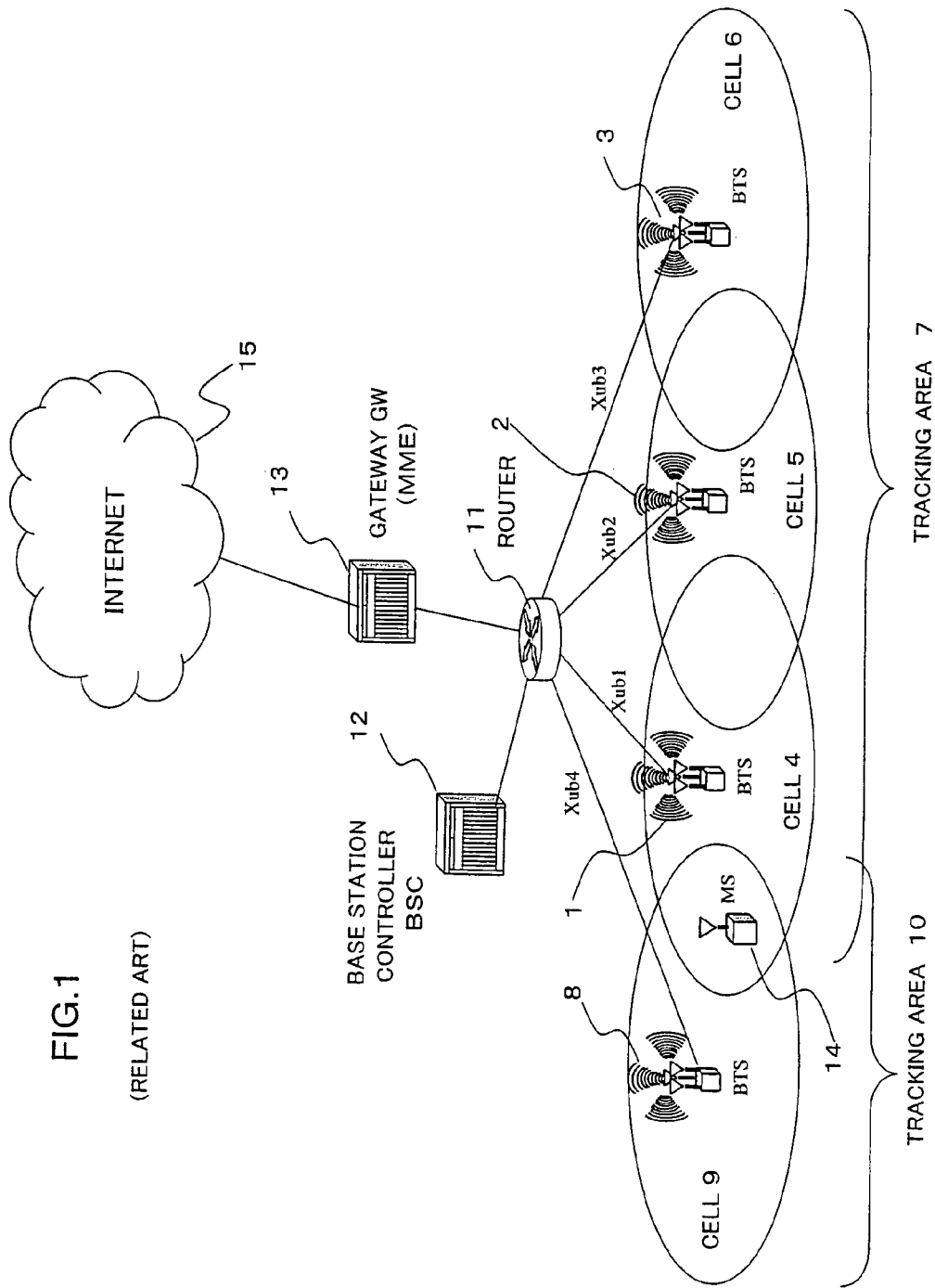
FIG. 1 is a schematic diagram of a conventional mobile communications system.
Figure 2:
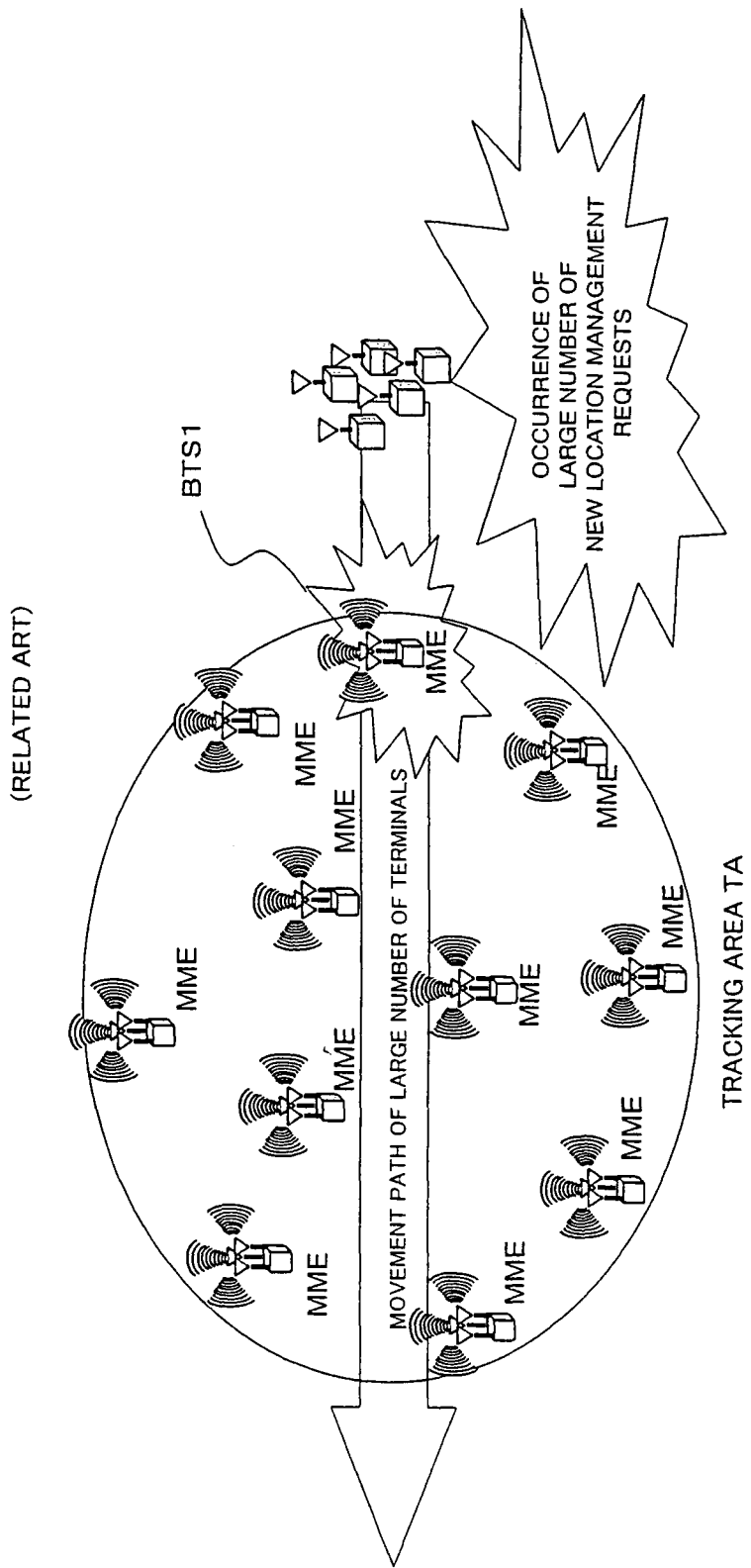
FIG. 2 is a schematic diagram showing an example in which an excessive load state is created in a distributed mobility management system.
Figure 3:
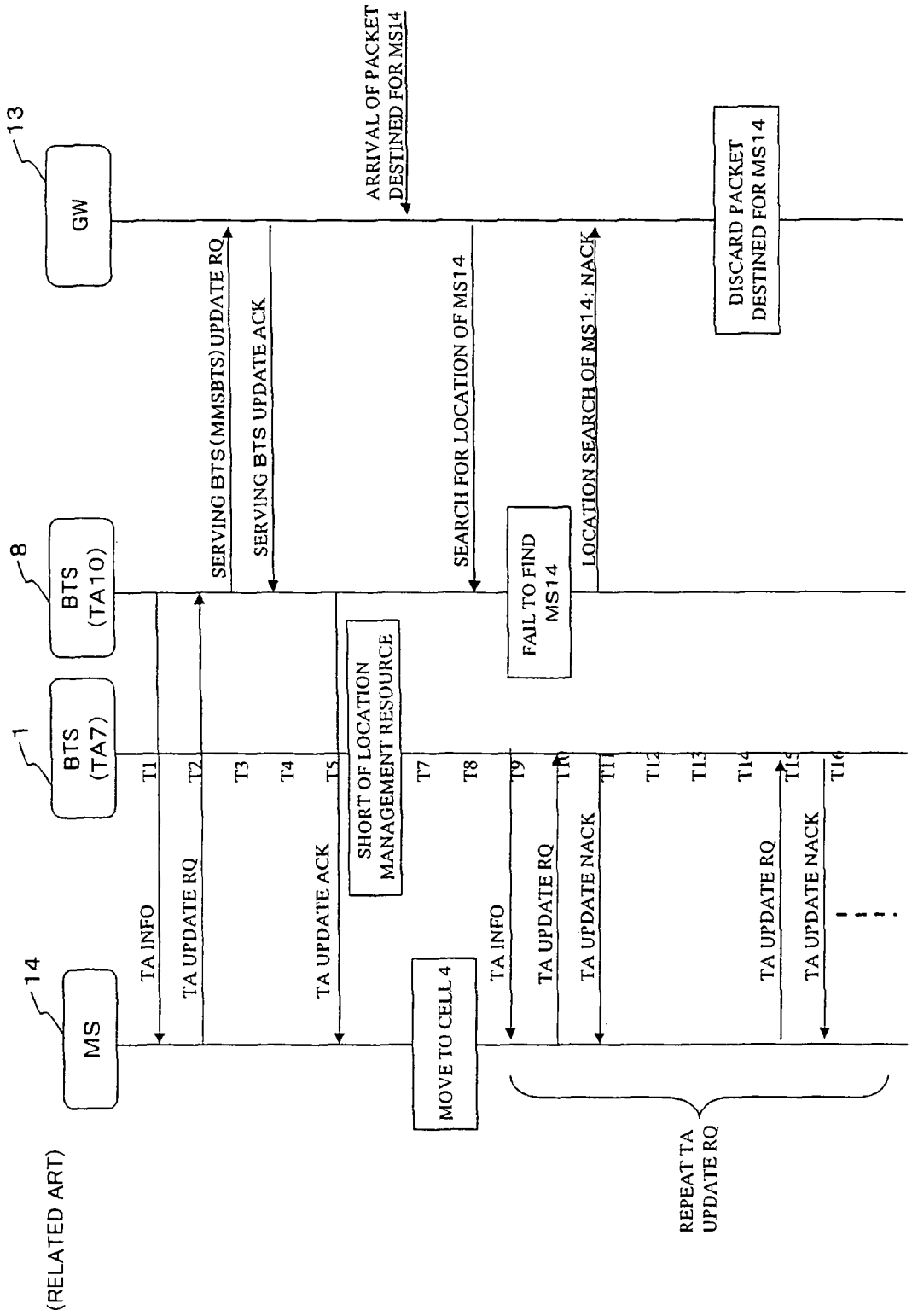
FIG. 3 is a sequence diagram showing an example of a process of disconnecting communication with a mobile station in a conventional mobility management method.
Figure 4:
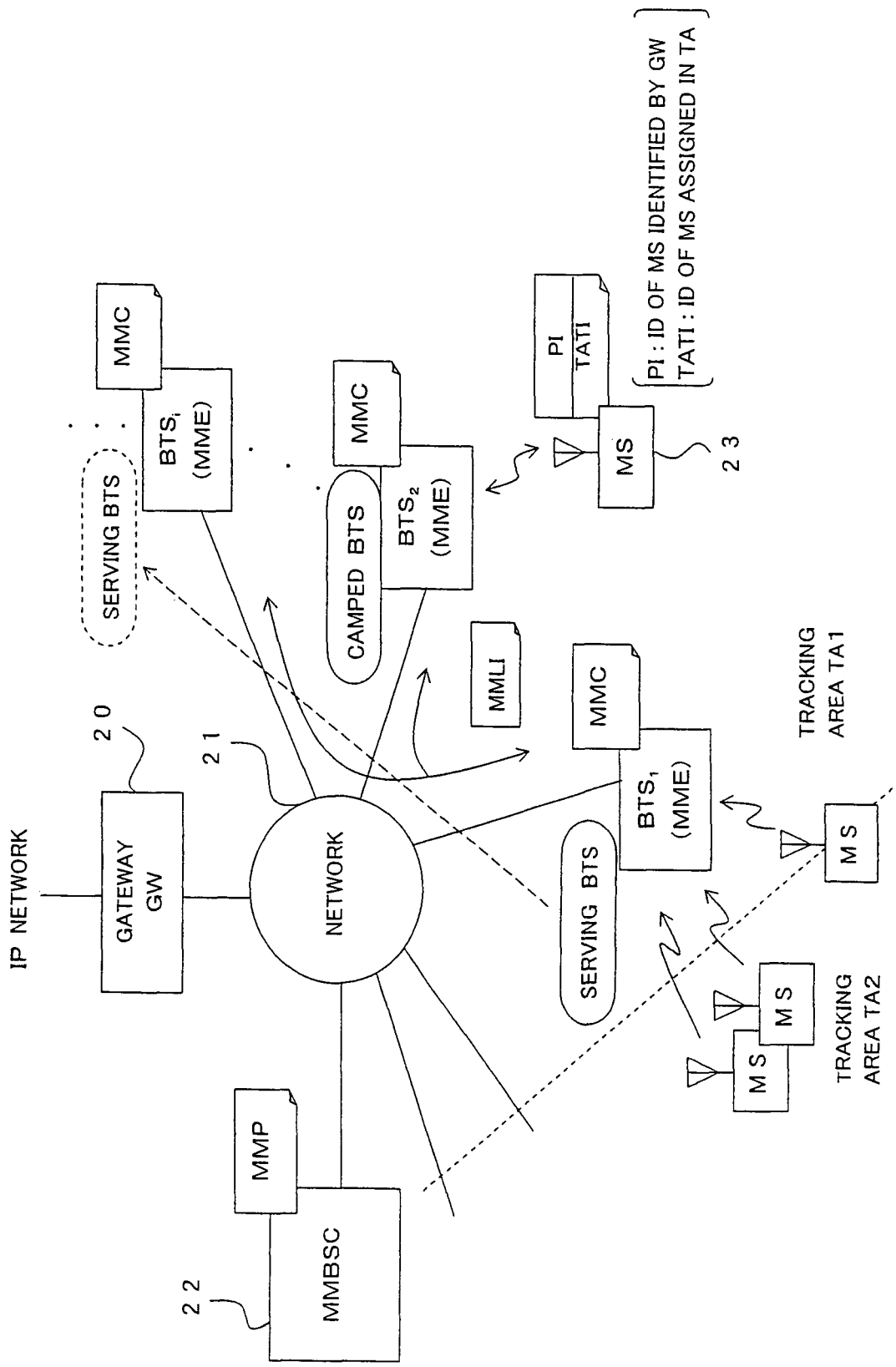
FIG. 4 is a schematic diagram of a mobile communications system according to a mode of the present invention.

FIG. 4 is a schematic diagram of a mobile communications system according to a mode of the present invention. Here, to avoid complexity, it is assumed that N base stations $BTS_1$ to $BTS_N$ constitute a tracking area TA1 and that the base station $BTS_1$ is a base station installed near the tracking area boundary. Moreover, it is assumed that the function of a serving base station (serving BTS) of a mobile station is relocated from the base station $BTS_1$ to another base station $BTS_i$ ($2 \le i \le N$) based on mobility management control, which will be described later. The base stations $BTS_1$ to $BTS_N$ can communicate with each other through a network 21 and also can communicate with each of a mobility management base station controller (MMBSC) 22 and a gateway (GW) 20.

In the mobile communications system according to the present invention, a mobility management entity MME exists in each of the base stations $BTS_1$ to $BTS_N$ and performs mobility management including assignment of a temporary identity (unique number) to a mobile station (or UE: User Equipment), relocation/allocation of a serving BTS, and the like.

A mobile station 23 shown in FIG. 4 is currently present in the cell of the base station $BTS_2$. However, it is assumed that the mobile station 23 originally came from a tracking area TA2 into the tracking area TA1 and sent an area update request to the base station $BTS_1$, which then generated mobility management information (MMC) for the mobile station 23 and assigned a temporary identity (TATI: Tracking Area Temporary Identity) used within the tracking area TA1 to the mobile station 23. Therefore, in this case, the base station $BTS_1$ is the serving base station (hereinafter, also referred to as mobility management serving base station or MMSBTS where appropriate) of the mobile station 23, which is a location management entity for the mobile station 23 in the tracking area TA1, and serves as a mediating base station between the gateway 20 and the mobile station 23. On the other hand, the base station $BTS_2$, in the cell of which the mobile station 23 is currently present, is the camped base station (hereinafter, also referred to as mobility management camped base station or MMCBTS where appropriate) of the mobile station 23. A camped base station is selected by a mobile station.

The correspondence between the mobile station 23 and the base station $BTS_1$ in the tracking area TA1 is registered in the gateway 20. Incidentally, the gateway 20 identifies each mobile station by using a unique number PI (Permanent Identity).

Control signals are transmitted between the mobile station 23 and the gateway 20 through the base station $BTS_1$ which is a serving BTS of the mobile station 23. For example, when a packet destined for the mobile station 23 arrives at the gateway 20, the gateway 20 inquires of the base station $BTS_1$, which is a serving BTS of the mobile station 23, about the location of the mobile station 23. The base station $BTS_1$ inquires of all the other base stations $BTS_2$ to $BTS_N$ in the tracking area TA1 about the location of the mobile station 23. Here, since the base station $BTS_2$ responds with an ACK response, the base station $BTS_1$ notifies the ID of the base station $BTS_2$ to the gateway 20, whereby the data destined for the mobile station 23 reaches the mobile station 23 via the network 21 and the base station $BTS_2$. Reversely, when the mobile station 23 sends data to the Internet through the gateway 20, a call setup request from the mobile station 23 is transferred from the camped base station $BTS_2$ to the gateway 20 via the serving base station $BTS_1$. When a connection is thus established between the mobile station 23 and the gateway 20, the data from the mobile station 23 is transferred to the gateway 20 via the base station $BTS_2$.

Additionally, it is also possible that a camped base station, in the cell of which the mobile station 23 is currently located, is notified to the serving base station $BTS_1$ periodically, whereby the serving base station $BTS_1$ always tracks the location of the mobile station 23. In this case, a quick response can be made to an inquiry from the gateway 20 about the location of the mobile station 23.

Basic parameters required for load adjustment among the base stations are previously set in each base station. Based on these parameters, each base station monitors its own load state, or the load states of the other base stations as well as its own load state, and performs load adjustment so that the loads on the other base stations and its own load become as even as possible. For example, adjustment of the load on each base station is performed in such a manner that the base station $BTS_1$ near the tracking area boundary, which is likely to serve many mobile stations as MMSBTS and likely to be most highly loaded, relocates the mobility management information of a mobile station to another base station $BTS_i$, or in such a manner that, when the load on the base station $BTS_1$ exceeds a predetermined level, the base station $BTS_1$ allocates to another base station $BTS_i$ the handling of a new area registration request from a newly coming mobile station MS. For such load adjustment, in addition to the exchanges of load information with the other base stations, each base station has preset criteria for determining whether to allocate or relocate mobility management information to another base station and whether to accept or reject such allocation and the like. Next, description will be given of information elements to be transmitted and received for such load adjustment.

(a) Mobility Management Parameters MMP

The base station controller 22 has mobility management parameters MMP required for each base station to perform mobility management and, when the system is initialized, transfers them to each base station. Each base station sets their internal parameter values in accordance with the mobility management parameters MMP. These parameters include basic parameters required for load adjustment among the base stations, which will be described later. As an example, the mobility management parameters MMP include the following parameters:

BTS_ID: ID specific to a base station

TA_ID: ID specific to a tracking area TA to which the base station belongs

TATI_total=[TATI(1), . . . , TATI(M)]: Temporary identities for mobile station identification ($N_{total}$ (total number of temporary identities for mobile station identification) =M)

NBTS_ID=[BTS_ID(1), . . . , BTS_ID(L)]: IDs of neighboring base stations with which load information is exchanged Threshold values for load adjustment.

The threshold values for load adjustment can include allocation-related threshold values, relocation-related threshold values, and/or notification-related threshold values as recited below, for example:

SR_T: Allocation request threshold value

PR_T: Allocation rejection threshold value

HLCR_T: High-load registration relocation threshold value

LLCR_T: Low-load registration relocation threshold value

HLR_T: High-load notification threshold value/allocation restriction threshold value LLR_T: Low-load notification threshold value/allocation acceptance threshold value (b) Mobility Management Context MMC Each base station having the mobility management function generates and stores a mobility management context MMC as the mobility management information on a mobile station. A serving base station (MMSBTS) is specified for a mobile station in a tracking area TA in question. As an example, the mobility management context MMC includes the following information:

MMSBTS_ID: ID of a serving base station (MMSBTS) of a mobile station

MS_ID: ID (PI, TATI) of the mobile station (c) Mobility Management Load Information MMLI Mobility management load information MMLI is information elements to be exchanged between base stations, for a base station in question to perform load adjustment with neighboring base stations. As an example, the mobility management load information MMLI includes the following information:

Sender BTS_ID: ID of a base station that has sent MMLI

TA_ID: ID of a tracking area to which the base station having sent MMLI belongs

Timestamp: Time at which this MMLI is generated

LOAD_STATE: Current load state of the base station (e.g., HIGH, MIDDLE, or LOW)

It suffices that the load state, or location management resource use rate, of a base station is indicated by using a plurality of levels. The load state also can be represented by load type. For example, the ratio of $N_{use}$ to $N_{total}$ ($N_{use}/N_{total}$), where $N_{use}$ is the number of temporary identities already assigned and $N_{total}$ is the total number of temporary identities for mobile station identification set in each base station, or the CPU use rate (%) of a base station can be used as the load state or location management resource use rate of the base station. Alternatively, the combination of $N_{use}/N_{total}$ and the CPU use rate may be used to represent one load state. In any case, it is desirable to use an indicator that represents the load state of each base station so that load adjustment can be performed among the base stations appropriately.

1. Base Station

Figure 5:
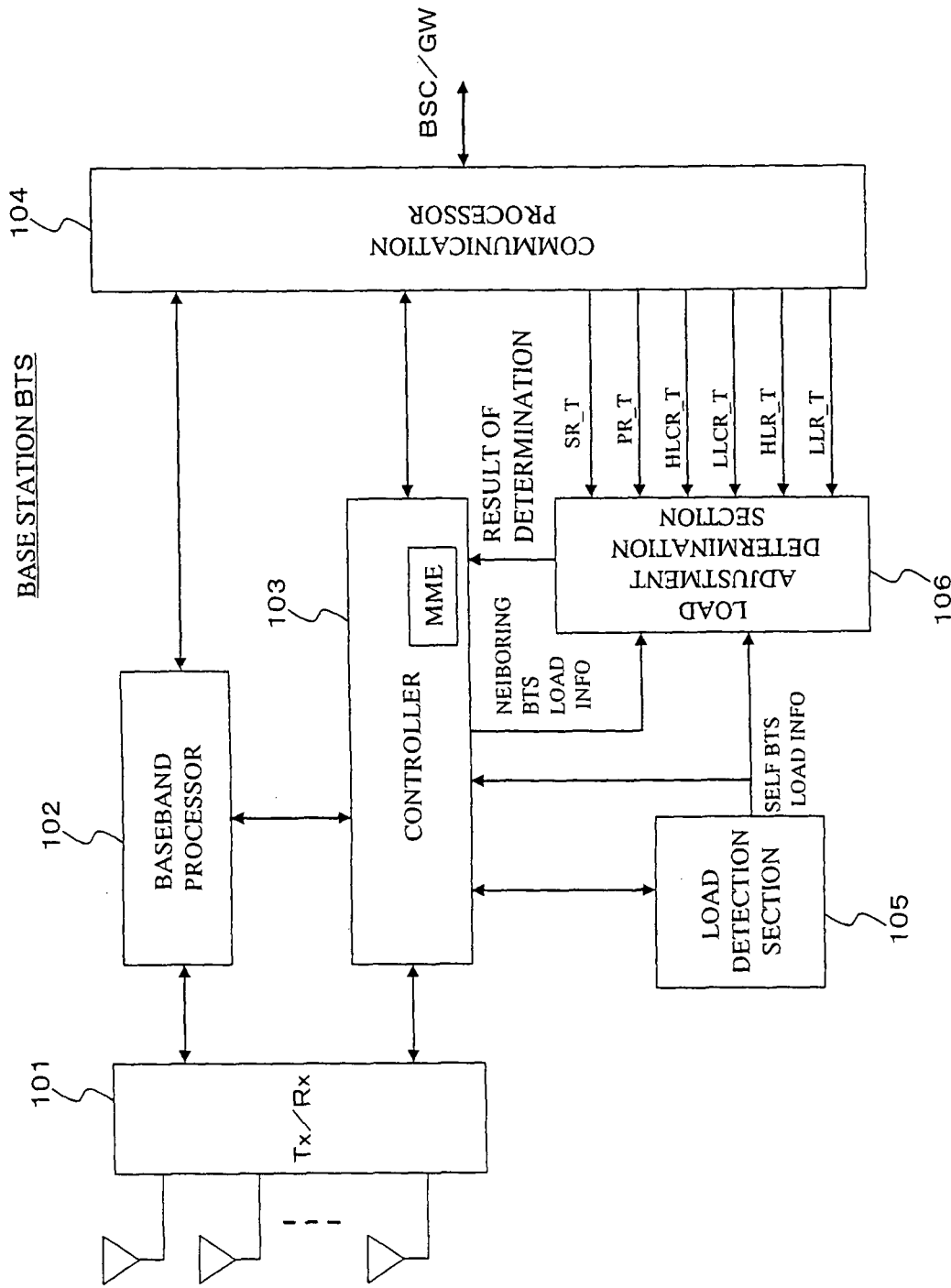
FIG. 5 is a block diagram showing a schematic configuration of a base station according to the mode of the present invention.

FIG. 5 is a block diagram showing a schematic configuration of a base station according to the mode of the present invention. The base station BTS has a wireless system 101 for performing wireless communications with mobile stations located in its own cell. The base station BTS also has a baseband processor 102, a controller 103, and a communication processor 104. The baseband processor 102 and controller 103 perform the processing of user data and control signals, respectively, and the communication processor 104 can transmit and receive the user data and control signals to and from the gateway 20 or the base station controller 22 through the network 21.

The controller 103 includes a mobility management entity MME. When receiving the above-described mobility management parameters MMP from the base station controller 22 at the time of initialization, the controller 103 sets necessary parameters, making the mobility management function ready. In addition, the threshold values for load adjustment are set in a load adjustment determination section 106. Here, as an example, the allocation-related threshold values SR_T and PR_T, the relocation-related threshold values HLCR_T and LLCR_T, and the notification-related threshold values HLR_T and LLR_T are set as the threshold values for load adjustment, the details of which will be described later. It is also possible to set SR_T, PR_T, HLR_T, and LLR_T as alloation/reloation-related threshold values. Further, the controller 103 receives mobility management load information MMLI from each of neighboring base stations (NBST_ID) that have been set as the base stations with which load information is exchanged through the network 21. The controller 103 extracts the load state of each neighboring base station from LOAD_STATE and outputs it to the determination section 106.

The load state of the base station is detected by a load detection section 105. As described above, the rate of use of the temporary identities for mobile station identification ($N_{use}/N_{total}$) or the CPU use rate of the base station can be used as the load state of that base station. The controller 103 stores the load state of the base station in LOAD_STATE of mobility management load information MMLI, which is transmitted to each of the neighboring base stations (NBTS_ID) from the communication processor 104. The transmission of the mobility management load information MMLI may be carried out periodically. However, it is more preferable to carry out the transmission at a timing that meets a predetermined condition, which will be described later, because the load on the network 21 is less increased.

The load adjustment determination section 106 receives as input the load states of the neighboring base stations and of the base station and compares them with the preset threshold values for load adjustment, thereby determining whether to request an allocation/relocation of MMSBTS, whether to accept/reject a request from a neighboring base station, and so forth.

Incidentally, the functions of the controller 103, communication processor 104, load detection section 105, and load adjustment determination section 106 can also be implemented by executing respective programs on a program-controlled processor. Hereinafter, the threshold values for load adjustment and load adjustment operation will be described in detail.

2. Load Adjustment 2.1) Allocation Request and Allocation Rejection

FIG. 6 shows the settings of a threshold value related to an allocation request as to the load on a base station and a threshold value related to a rejection of an allocation request. For simplicity, "allocation request" is also represented by "ALLOC RQ" in the following figures.

As shown in FIG. 6, the allocation request threshold value SR_T is a reference value used to determine whether or not a new area registration request can be allocated to a neighboring base station. Since it becomes more difficult to accept a new area registration as the load (location management resource use rate) becomes higher, it is desirable to allocate a new area registration to a neighboring base station before it becomes difficult to carry out processing.

Here, when the load on the present base station exceeds the allocation request threshold value SR_T, an allocation request as to the processing for a new area registration, when it occurs, can be sent out to the neighboring base stations. If the load on the present base station is not higher than the allocation request threshold value SR_T, no allocation request is made. By setting a certain reference value for making an allocation request as described above, it is possible to promote load adjustment among the base stations without imposing a load on the network 21.

Moreover, the allocation rejection threshold value PR_T is a reference value used to determine whether or not an allocation request as to a new area registration request from a neighboring base station can be rejected. Since it becomes more difficult to accept a new area registration as the load (location management resource use rate) becomes higher, it is desirable to reject an allocation request from another base station when the load becomes high to a certain extent. Here, even if an allocation request as to a new area registration is sent from a neighboring base station, a signal to reject the allocation request can be sent back to that neighboring base station when the load on the present base station exceeds the allocation rejection threshold value PR_T.

On the other hand, if the load on the present base station is not higher than the allocation rejection threshold value PR_T, an allocation request as to a new area registration from a neighboring base station cannot be rejected. Thus, it is possible to control the load of accepting the allocation request, in the case where the load on the neighboring base station is as high as the allocation request is made as described above and where the load on the present base station is low. For example, the allocation rejection threshold value PR_T is set at a lower value than the allocation request threshold value SR_T, whereby a base station with a load exceeding the allocation request threshold value SR_T sends out an allocation request and, if there is a base station with a load not higher than the allocation rejection threshold value PR_T among the neighboring base stations, can allocate a new area registration to this neighboring base station. Thus, load adjustment among the base stations can be promoted.

Incidentally, when an allocation request is rejected by every neighboring base station (i.e., when every neighboring base station is highly loaded), the base station that has made the allocation request generates a mobility management context MMC for the mobile station that has made a new area registration request, and registers itself with the gateway 20 as the MMSBTS of this mobile station.

2.2) Relocation Request

FIG. 7 shows the settings of the threshold values related to relocation requests as to the load on a base station. The relocation requests include a request (PUSH request) to relocate to a neighboring base station a mobility management context for a mobile station that the present base station serves as a serving base station (i.e., to relocate location management from the present base station to a neighboring base station), and a request (PULL request) to relocate to the present base station a mobility management context for a mobile station that a neighboring base station serves as a serving base station (i.e., to relocate location management from a neighboring base station to the present base station).

The high-load registration relocation threshold value HLCR_T is a reference value used to determine whether or not a PUSH request can be made to a neighboring base station. When the load (location management resource use rate) becomes high, not only it is difficult to accept a new TA registration, but also a delay occurs in processing. Therefore, it is desirable to relocate the responsibility that the present base station currently has as a serving base station of a mobile station, to a neighboring base station before it becomes difficult to carry out processing. Here, when the load on the present base station exceeds the high-load registration relocation threshold value HLCR_T, the present base station can select one mobile station or a plurality of mobile stations that the present base station is serving as a serving base station, and can send a PUSH request to relocate the responsibility to the selected mobile station(s) to a neighboring base station. The mere fact of being no longer a serving BTS can reduce the amount of processing for location management as described above, resulting in the reduced load. If the load on the present base station is not higher than the high-load registration relocation threshold value HLCR_T, no PUSH request is made.

The low-load registration relocation threshold value LLCR_T is a reference value used to determine whether or not a PULL request can be made to a neighboring base station. When the load (location management resource use rate) becomes low to a certain extent, it is desirable, if there is a neighboring base station that is highly loaded, to relocate the location management that this neighboring base station performs as a serving base station, in order to equalize the loads among the base stations. Here, when the load on the present base station becomes equal to or lower than the low-load registration relocation threshold value LLCR_T, the present base station can make a PULL request. When the load on the present base station exceeds the low-load registration relocation threshold value LLCR_T, no PULL request is made.

Preferably, the low-load registration relocation threshold value LLCR_T is set at a lower value than the high-load registration relocation threshold value HLCR_T. This is because when a base station with a load exceeding the high-load registration relocation threshold value HLCR_T sends out a PUSH request and if there is a neighboring base station with a load equal to or lower than the low-load registration relocation threshold value LLCR_T, it is easy for the base station with the high load to relocate its responsibility for location management to the neighboring base station. Thus, load adjustment among the base stations can be promoted.

Incidentally, when no neighboring base station makes a PULL request even if a PUSH request has been made (i.e., when every neighboring base station is highly loaded), the base station that has made the PUSH request keeps the position as a serving base station.

2.3) High-Load/Low-Load Notification

FIG. 8A shows the settings of the threshold values related to high-load and low-load notifications as to the load on a base station. FIG. 8B is a diagram for describing the timings of carrying out the high-load and low-load notifications.

Referring to FIG. 8A, the high-load notification threshold value HLR_T is a reference value used to determine whether or not LOAD_STATE of mobility management load information MMLI can be set to "HIGH" and sent to a neighboring base station. When the load (location management resource use rate) becomes high, it is difficult not only to accept a new area registration request, but also to accept the location management of a serving base station from a neighboring base station. Therefore, it is preferable to allocate a new area registration request, when it occurs, to a neighboring base station, or to relocate the responsibility for location management that the present base station has as a serving base station of a mobile station, to a neighboring base station.

Here, a base station can send mobility management load information MMLI (LOAD_STATE="HIGH") to its neighboring base stations when the load on itself exceeds the high-load notification threshold value HLR_T. The neighboring base stations that have received this MMLI (LOAD_STATE="HIGH") determine that the base station sending this MMLI is in a high-load state, and will not make an allocation request or a relocation request to this base station.

A base station can send mobility management load information MMLI (LOAD_STATE="LOW") to its neighboring base stations when the load on itself is not higher than the low-load notification threshold value LLR_T. The neighboring base stations that have received this MMLI (LOAD_STATE="LOW") determine that the base station sending this MMLI is in a low-load state. If necessary, the neighboring base stations can make an allocation request or a relocation request to this base station. In the case where a base station receives MMLI (LOAD_STATE="LOW") from a plurality of neighboring base stations, the base station may determine the destination of allocation or relocation in order of the arrival time of MMLI (from the latest to the earliest).

Incidentally, a base station sends mobility management load information MMLI (LOAD_STATE="MIDDLE") to its neighboring base stations in the case where the load on itself is higher than the low-load notification threshold value LLR_T but is not higher than the high-load notification threshold value HLR_T.

In addition, when a base station sends mobility management load information MMLI (LOAD_STATE="HIGH") to its neighboring base stations but does not receive MMLI (LOAD_STATE="LOW") from any of the neighboring base stations (i.e., when every neighboring base station is highly loaded), this base station accepts a new area registration request or keeps the responsibility as a serving base station.

Mobility management load information MMLI may be transmitted periodically. However, the amount of transmission can be reduced by transmitting MMLI at timings where, as shown in FIG. 8B, the value of the load (location management resource use rate) intersects with the low-load notification threshold value LLR_T and the high-load notification threshold value HLR_T. In other words, a base station transmits MMLI (LOAD_STATE="HIGH") to its neighboring base stations at a timing when the current value of the load just exceeds the high-load notification threshold value HLR_T. The base station transmits MMLI (LOAD_STATE="MIDDLE") to the neighboring base stations at a timing when the current high value of the load just falls below the high-load notification threshold value HLR_T. The base station transmits MMLI (LOAD_STATE="LOW") to the neighboring base stations at a timing when the current value of the load just falls below the low-load notification threshold value LLR_T. The base station transmits MMLI (LOAD_STATE="MIDDLE") to the neighboring base stations at a timing when the current low value of the load just exceeds the low-load notification threshold value LLR_T.

2.4) Examples of Setting of Allocation/Relocation-Related Threshold Values

The threshold values for load adjustment to be set in a base station are determined generally based on the following policy.

(1) When the load on the present base station is very low, an allocation/relocation request from another base station is welcome, for balance with other base stations.

(2) When the load increases from this low load, an allocation/relocation request from another base station is not welcome but is not rejected either.

(3) When the load further increases, a request to stop sending an allocation/relocation request is made, but an allocation/relocation request, if any, is not rejected.

(4) When the load still further increases, an allocation/relocation request from another base station is rejected.

(5) When the load on the present station is very high, an allocation/relocation request is made to another base station.

Next, an example will be described in which the threshold values for load adjustment are set under the above-described policy.

FIG. 9 shows the settings of the threshold values related to an allocation request as to the load on a base station, allocation rejection, allocation stop, and allocation welcome. It is assumed that "allocation" in this case includes "relocation". Description will be given of the case, as an example, where the allocation-related control parameter SR_T and the relocation-related control parameter HLCR_T are identical and where, similarly, the allocation-related control parameter PR_T and the relocation-related control parameter LLCR_T are identical.

First, the allocation request threshold value SR_T is a reference value used to determine whether or not an allocation request can be made to a neighboring base station. When the load (location management resource use rate) becomes higher than the allocation request threshold value SR_T, a base station can make an allocation request to its neighboring base stations. In the load state where the load is not higher than the allocation request threshold value SR_T and is higher than the allocation rejection threshold value PR_T, the base station cannot make an allocation request to the neighboring base stations but can reject an allocation request from a neighboring base station. In the load state where the load is not higher than the allocation rejection threshold value PR_T and is higher than the allocation restriction threshold value HLR_T, the base station cannot reject an allocation request from a neighboring base station but can notify the neighboring base stations to stop sending an allocation request. In the load state where the load is not higher than the allocation restriction threshold value HLR_T and is higher than the allocation acceptance threshold value LLR_T, the base station cannot notify the neighboring base stations to stop sending an allocation request but does not welcome an allocation request from a neighboring base station. In the load state where the load is not higher than the allocation acceptance threshold value LLR_T, the base station welcomes an allocation request from a neighboring base station. Welcoming an allocation request from another base station means that, for example, the base station notifies the neighboring base stations that it is in a low-load state and can accept an allocation request.

Next, detailed description will be given of the load adjustment operation of a base station in the case where the above-described allocation request threshold value SR_T, allocation rejection threshold value PR_T, allocation restriction threshold value HLR_T, and allocation acceptance threshold value LLR_T are set in the determination section 106 of the base station shown in FIG. 5.

FIG. 10 is a flowchart showing determination operation of a base station for load adjustment, according to the present mode. First, the controller 103 of the base station uses NBTS_ID=[BTS_ID(1), . . . , BTS_ID(L)] of mobility management parameters MMP set by the base station controller 22 to identify the neighboring base stations within the same tracking area with which the base station can exchange load information (step S201). Subsequently, the controller 103 transfers the current load L on the present base station, which is measured by the load detection section 105, to the determination section 106 (step S202).

The determination section 106 first compares the current load L with the allocation request threshold value 5 8R_T (step 8203). When L >8R_T (YES in step 8203), the controller 103 selects an allocation-destination base station from the neighboring base stations (step 8204). Further, if the present base station is a serving base station of mobile stations at present, then the controller 10 103 selects one or more mobile station for allocation from the mobile stations and sends an allocation request to the allocation-destination neighboring base station (step 8205). As a mobile station to allocate, for example, a mobile station is selected that is in an idle state of not carrying out communication, and has no data 15 to transmit/receive.

When the current load L is not higher than the allocation request threshold value SR_T (NO in step S203), the determination section 106 compares the current load L with the allocation rejection threshold value PR_T (step S206). When L>PR_T (YES in step S206), the controller 103 rejects an allocation request even if a neighboring base station sends the allocation request (step S207). On the other hand, when the current load L is not higher than the allocation rejection threshold value PR_T (NO in step S206), the controller 103 accepts an allocation request, if any, from a neighboring base station (step S208).

The determination section 106 further compares the current load L with the allocation restriction threshold value HLR_T (step S209). When L>HLR_T (YES in step S209), the controller 103 notifies the neighboring base stations to stop sending an allocation request to the present base station (step S210). When the current load L is not higher than the allocation restriction threshold value HLR_T (NO in step S209), the determination section 106 further compares the current load L with the allocation acceptance threshold value LLR_T (step S211). When L>LLR_T (YES in step S211), the current state is maintained. When the current load L is not higher than the allocation acceptance threshold value LLR_T (NO in step S211), the controller 103 notifies the neighboring base stations that the present base station can accept an allocation request (step S212).

As described above, the allocation request threshold value SR_T, allocation rejection threshold value PR_T, allocation restriction threshold value HLR_T, and allocation acceptance threshold value LLR_T are set in each base station. Thereby, when the load on a base station becomes high, the base station reduces the load by making an allocation request, and when the load becomes lower, the base station rejects an allocation request from another base station or requests to stop sending an allocation request, depending on the level of the load. Further, when the load becomes still lower, the base station actively prompts other base stations to send an allocation request. Thus, the uneven loads on the base station and the neighboring base stations can be adjusted with accuracy.

2. Mobile Station

A mobile station in the mobile communications system according to the present invention is a mobile communication terminal having a communication function, such as a mobile telephone or mobile information terminal, for example. When a mobile station is powered on in a tracking area or comes into a tracking area from another tracking area by crossing the boundary, the mobile station sends an area update request to the nearest base station BTS and is assigned a temporary identity TATI in this tracking area by the base station BTS. The mobile station includes, as shown in FIG. 4, memory means for storing a temporary identity TATI and a permanent identity PI, and control means, or a microprocessor, for performing communication control and data processing.

The mobile station periodically or non-periodically checks reception sensitivities to signals from the surrounding cells and connects to the base station covering a cell that produces the best reception sensitivity, thus setting this base station as a mobility management camped base station (MMCBTS). The mobile station reads broadcast information from the camped base station MMCBTS and checks the tracking area to which the current camped base station MMCBTS belongs.

When the tracking area to which the camped base station MMCBTS belongs is different from the tracking area previously location-registered, the mobile station sends a TA UPDATE REQUEST to the camped base station MMCBTS. When receiving a TA UPDATE ACK from this base station, the mobile station sets a mobility management serving base station (MMSBTS) in this tracking area.

The mobile station periodically or non-periodically checks the presence or absence of a serving base station update (MMSBTS UPDATE) from a current camped base station MMCBTS. If receiving a MMSBTS UPDATE, the mobile station sets information about a new serving base station MMSBTS, which is contained in the MMSBTS UPDATE massage.

For example, there are some cases where, as shown in FIG. 4, the load on the boundary base station $BTS_1$ increases while the mobile station 23 is moving in the tracking area TA1, and the base station $BTS_1$ selects the mobile station 23 as the object of relocation request. In such a case, as described above, the role of the serving base station MMSBTS of the mobile station 23 is relocated to another base station. When the serving base station MMSBTS is changed, the mobile station 23 sets information about a new serving base station.

In this event, since this new serving base station assigns a temporary identity TATI to the mobile station 23, the temporary identity TATI of the mobile station 23 is changed to the new one even in the same tracking area TA1.

However, the change of a temporary identity within the same tracking area TA is performed in the case where the mobile station 23 is in an idle state and is being location-managed.

4. Gateway

When the gateway 20 receives a serving base station update request (MMSTBS UPDATE REQUEST) from a base station, the gateway 20 changes its internal information about the MMSBTS of a mobile station for which the MMSTBS UPDATE REQUEST has been made. Thereafter, the gateway 20 sends a MMSBTS UPDATE ACK to the base station, thereby notifying the base station that the gateway 20 has finished changing its internal information. If any other serving base station of this mobile station has existed before, the gateway 20 sends a MMSBTS RELEASE REQUEST to this former serving base station.

As described above, when the gateway 20 transmits a data packet to a mobile station, the gateway 20 refers to the information about the MMSBTS of this mobile station, which the gateway 20 maintains, inquires of this base station serving as MMSBTS about the location of the mobile station, and transfers the data packet destined for the mobile station to a base station to which the mobile station is connecting.

5. Another Mode

In the first mode as described above, the determination operation for load adjustment is performed by each base station. However, the present invention is not limited to the first mode. It is also possible that the determination operation is performed by a central controller connected to the network 21. For example, the central controller has means for receiving and collecting load information measured by each base station, determination means for performing for each base station the determinations described in the foregoing paragraphs about load adjustment, and means for notifying the results of these determinations to each base station. Even with such a structure, effects similar to those of the first mode can be obtained, and the load on a base station can be reduced, although detailed description of the determination operation will be omitted because the operation is the same as the above-described operation.

First embodiment

FIG. 11 is a sequence diagram showing a mobility management control method according to a first embodiment of the present invention. FIG. 12 schematically shows pieces of information contained in signals used in this sequence. According to the first embodiment, a base station serving as a serving base station which has fallen in a high-load state relocates a mobility management context MMC for a mobile station to a neighboring base station with a reduced load if there is such a reduced-load base station among the neighboring base stations, thereby relocating the location management as a serving base station to this neighboring base station.

First, a mobile station 23 is initialized, for example, when powered on in a tracking area (time T1). Then, it is assumed that, based on a broadcast signal received from a base station 24 producing the best reception sensitivity, the mobile station 23 confirms that the tracking area is different from the tracking area that has been location-registered previously. In this case, the mobile station 23 sends a TA UPDATE REQUEST (see FIG. 12(a)) to the base station 24 (time T2).

Upon receipt of the TA UPDATE REQUEST, the base station 24 generates a mobility management context MMC for the mobile station 23 and sends a MMSBTS UPDATE REQUEST (see FIG. 12(b)) to a gateway 20 (time T3). In response to this, the gateway 20 updates its internal database and sends a MMSBTS UPDATE ACK (see FIG. 12(c)) back to the base station 24, thereby notifying the completion of the MMSBTS update (time T4). Thereafter, whenever a data packet destined for the mobile station 23 arrives at the gateway 20, the gateway 20 checks with the base station 24, which is the MMSBTS of the mobile station 23, about the location of the mobile station 23. The base station 24, which has received the MMSBTS UPDATE ACK, sends a TA UPDATE ACK (see FIG. 12(d)) to the mobile station 23 (time T5), whereby the TA update sequence is finished.

In this state, it is assumed that a reduction has occurred in the load on a base station 25. The base stations 24 and 25 are mutually selected neighboring base stations. For example, it is assumed that the load on the base station 25 has fallen to or below the low-load notification threshold value LLR_T due to the fact that a plurality of mobile stations under the management of the base station 25 have moved to another tracking area, or the like. In this case, as described above, the base station 25 sends MMLI (LOAD_STATE="LOW") out to its neighboring base stations including the base station 24 (time T7).

At this point in time, it is assumed that the load on the base station 24 is equal to or higher than the high-load notification threshold value HLR_T. Therefore, the base station 24 sends a MMSBTS RELOC REQUEST (see FIG. 12(e)) to the base station 25 (time T8). In response to this MMSBTS RELOC REQUEST, the base station 25 generates a mobility management context MMC for the mobile station 23 and sends a MMSBTS UPDATE (see FIG. 12(g)) to the mobile station 23 (time T9). In response to the MMSBTS UPDATE received from the base station 25, the mobile station 23 sets information about the base station 25 as its new MMSBTS and sends a MMSBTS UPDATE ACK (see FIG. 12(h)) back to the base station 25 (time T10).

Upon receipt of this response, the base station 25 sends a MMSBTS UPDATE REQUEST (see FIG. 12(b)) to the gateway 20 (time T11). In response to this, the gateway 20 updates the database in which the base station 25 is registered as the new MMSBTS of the mobile station 23, and responds to the base station 25 with a MMSBTS UPDATE ACK (see FIG. 12(c)), thereby notifying the completion of the MMSBTS update (time T12). Upon receipt of the MMSBTS UPDATE ACK, the base station 25 sends a MMSBTS RELOC ACK (see FIG. 12(f)) to the base station 24 (time T13).

In this manner, the load of mobility management is relocated from the base station 24 to the base station 25, whereby the uneven loads on the two base stations are redressed. In addition, the uneven use rates of a transmission line to the base station 24 and a transmission line to the base station 25 are also leveled.

Second embodiment

Figure 13:
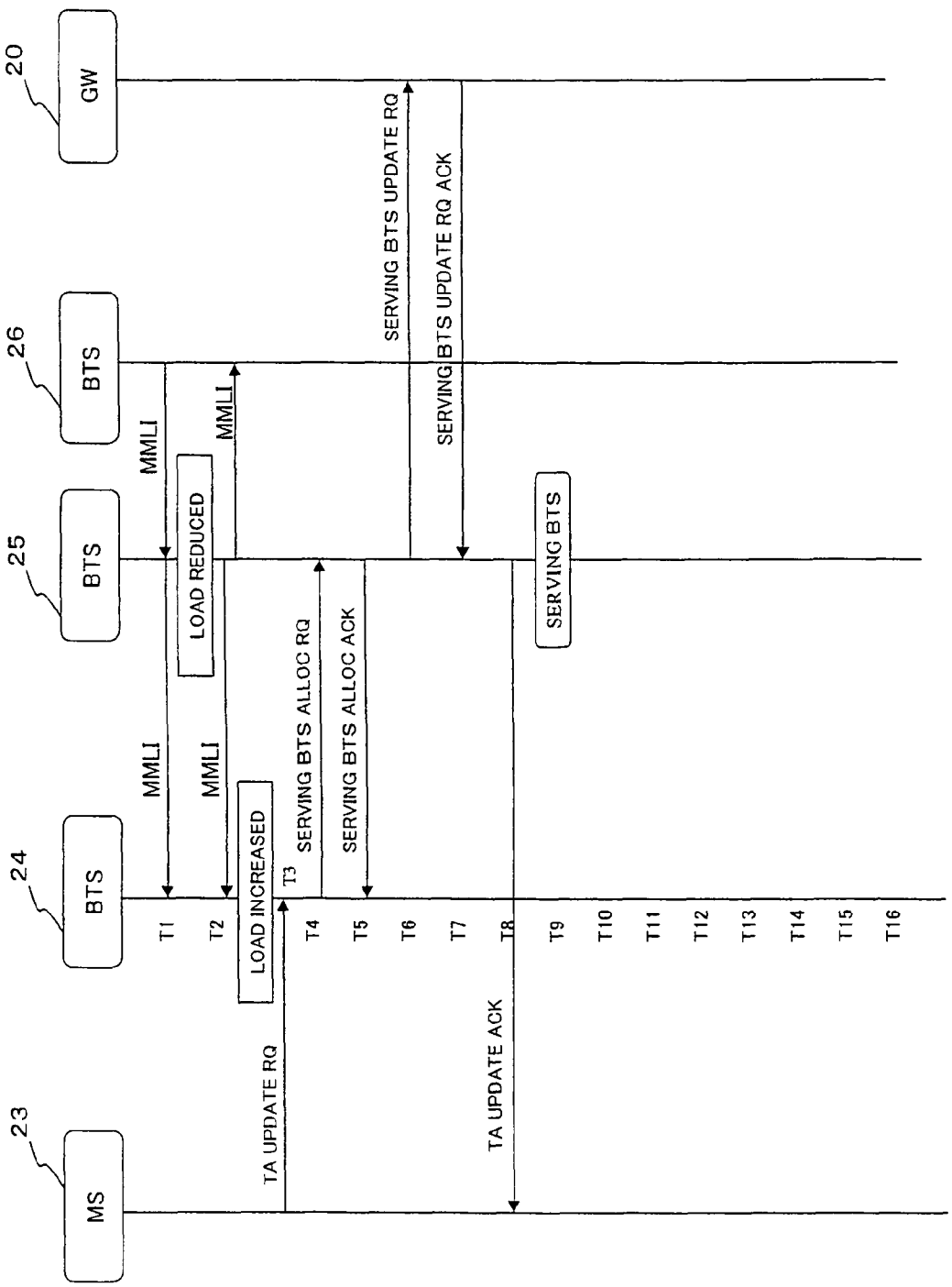
FIG. 13 is a sequence diagram showing a mobility management control method according to a second embodiment of the present invention.
Figure 14:
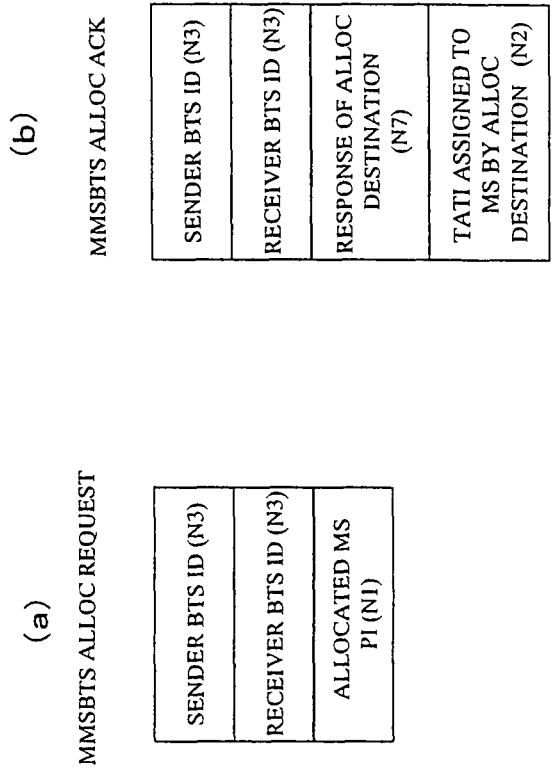
FIG. 14 schematically shows pieces of information contained in signals used in the sequence of FIG. 13.

FIG. 13 is a sequence diagram showing a mobility management control method according to a second embodiment of the present invention. FIG. 14 schematically shows pieces of information contained in signals used in this sequence. According to the second embodiment, if a new area update request occurs when a base station is in a high-load state, the update processing is allocated to a neighboring base station with a reduced load.

Base stations 24 to 26 are mutually selected neighboring base stations and are assumed to exchange MMLI with each other as described above. It is assumed that the load on the base station 26 has first fallen to or below the low-load notification threshold value LLR_T, and then the load on the base station 25 has also fallen to or below the low-load notification threshold value LLR_T, due to the fact that, for example, a plurality of mobile stations under their respective managements have moved to other tracking areas, or the like. In this case, as described above, the base stations 25 and 26 each sends MMLI (LOAD_STATE="LOW"), one after the other, to their neighboring base stations including the base station 24 (times T1 and T2). Additionally, it is assumed that the load on the base station 24 is equal to or higher than the high-load notification threshold value HLR_T.

In this state, it is assumed that a mobile station 23 is initialized in the cell of the base station 24, for example, when powered on and confirms based on a broadcast signal received from the base station 24 that the current tracking area is different from the one that has been location-registered previously. In this case, the mobile station 23 sends a TA UPDATE REQUEST (see FIG. 12(*a*)) to the base station 24 (time T3).

However, since the base station 24 is in a high-load state with a load equal to or higher than the high-load notification threshold value HLR_T, the base station 24 needs to allocate the new TA UPDATE REQUEST from the mobile station 23 to a neighboring base station. At this point in time, the neighboring base stations 25 and 26 have sent the low-load MMLI. Since the MMLI from the base station 25 is the latest, the base station 24 sends a MMSBTS ALLOC REQUEST (see FIG. 14(*a*)) to the base station 25 (time T4). Upon receipt of this MMSBTS ALLOC REQUEST, the base station 25 generates a mobility management context MMC for the mobile station 23 and sends a MMSBTS ALLOC ACK (see FIG. 14(*b*)) back to the base station 24 (time T5).

Subsequently, the base station 25 sends a MMSBTS UPDATE REQUEST (see FIG. 12(*b*)) to a gateway 20 (time T6). In response to this, the gateway 20 updates its internal database and sends a MMSBTS UPDATE ACK (see FIG. 12(*c*)) back to the base station 25, thereby notifying the completion of the MMSBTS update (time T7). Thereafter, whenever a data packet destined for the mobile station 23 arrives at the gateway 20, the gateway 20 checks with the base station 25, which is the MMSBTS of the mobile station 23, about the location of the mobile station 23. The base station 25, which has received the MMSBTS UPDATE ACK, sends a TA UPDATE ACK (see FIG. 12(*d*)) to the mobile station 23 (time T8). Based on the TA UPDATE ACK, the mobile station 23 registers information about the new MMSBTS.

As described above, a new area update request is allocated by the base station 24 to the base station 25, whereby the uneven loads on the two base stations are redressed. In addition, the uneven uses of a transmission path to the base station 24 and a transmission path to the base station 25 are also leveled. In this case, since a mobility management request itself is allocated, relocation of a mobility management entity can be avoided. Accordingly, transmission and reception of unnecessary control signals can be reduced.

Third embodiment

FIG. 15 is a sequence diagram showing a mobility management method according to a third embodiment of the present invention. In the third embodiment, it is assumed that, through the sequence of the second embodiment shown in FIG. 13, the base station 25 has become the MMSBTS of the mobile station 23, and that the mobile station 23 has moved around in the same tracking area and is currently present in the cell of the base station 26.

In this state, when a data packet destined for the mobile station 23 arrives at the gateway 20, the gateway 20 sends a location search request for searching for the location of the mobile station 23 to the base station 25, which is the MMSBTS of the mobile station 23 (time T1). In response to this, the serving base station 25 inquires of all the base stations in the tracking area TA, where the mobile station 23 is located (time T2). Since the mobile station 23 is currently located in the cell of the base station 26 in this case (times T3 and T4), the base station 26 sends a location search acknowledgment back to the serving base station 25 (time T5). The serving base station 25 notifies the gateway 20 that the mobile station 23 is located in the cell of the base station 26 (time T6). Upon receipt of this notification, the gateway 20 makes a call setup request to the base station 26 (time T7). When a connection with the mobile station 23 has been established (times T8 and T9), the gateway 20 transfers the data packet destined for the mobile station 23 to the mobile station 23 via the base station 26 (time T10).

If the load on the serving base station 25 rises as high as, for example, exceeding the high-load registration allocation threshold value HLCR_T after the data transfer has finished (time T11), it suffices that load adjustment is performed by carrying out the relocation processing 30 of relocating the responsibility for location management as MMSBTS to a neighboring base station, as in the first embodiment shown in FIG. 11.

The present invention can be applied to mobile communications systems having a mobility management function, such as, for example, mobile telephone systems and wireless broadband communication systems.

The invention claimed is:

1. A mobility management control method in a mobile communications system having at least one mobile station and a plurality of base stations, the method comprising:
   at each respective base station, monitoring a load state of at least the respective base station,
   performing, by one of the base stations that initially receives an area update request from a mobile station joining a tracking area, a mobility management function of performing location management for the mobile station within the tracking area; and
   determining whether the mobility management function of performing location management of a mobile station, which is in an idle state of not carrying out communication, is transferred from a single base station to another base station, depending on a request from one of the single base station and the other base station to the other of the single base station and the other base station, and on the load state of at least one base station.

2. The mobility management control method according to claim 1, wherein the single base station receives a load state of at least one other base station, wherein the b) is performed depending on the load state of the single base station and the load state of said at least one other base station.

3. The mobility management control method according to claim 1, wherein the single base station is a base station from which the mobile station has requested location management.

4. The mobility management control method according to claim 1, wherein after starting location management of the mobile station, the single base station determines whether the mobility management function of the mobile station is relocated to another base station, depending on the load state of the single base station and a load state of at least one other base station.

5. The mobility management control method according to claim 1, wherein the load state of the single base station is indicated by a use rate of location management resource.

6. The mobility management control method according to claim 1, wherein the plurality of base stations is divided into a plurality of mobile management areas, and wherein the location management of a mobile station is performed for each of the plurality of mobile management areas.

7. The mobility management control method according to claim 1, wherein the step b) is performed using at least two load threshold values which are different from each other, and each of the plurality of base stations transmits a first message when the load state of the base station exceeds a first load threshold value and transmits a second message when the load state of the base station drops to a second load threshold value or lower.

8. The mobility management control method according to claim 7, wherein, when the load state of the base station is higher than the first load threshold value and the load state of the other base station is equal to or smaller than the second load threshold value, the mobility management function requested by the mobile station is allocated to the other base station.

9. The mobility management control method according to claim 7, wherein, when the load state of the base station is higher than the first load threshold value and the load state of the other base station is equal to or smaller than the second load threshold value, the mobility management function of the mobile station is relocated to the other base station.

10. The mobility management control method according to claim 1, wherein the step b) is performed using at least two load threshold values which are different from each other, wherein each of the plurality of base stations rejects an allocation request received from another base station when the load state of the base station exceeds a first load threshold value, cannot reject an allocation or relocation request received from another base station when the load state of the base station drops to the first load threshold value or lower, and transmits a message to stop another base station sending an allocation or relocation request when the load state of the base station is equal to or lower than the first load threshold value and is higher than the second load threshold value.

11. A mobility management control device of a mobile communications system having at least one mobile station and a plurality of base stations, comprising:
    a determination section for determining whether a mobility management function of performing location management of a mobile station, which is in an idle state of not carrying out communication, is transferred from a single base station to another base station, depending on a request from one of the single base station and the other base station and a load state of at least one base station,
    wherein each respective base station monitors a load state of at least the respective base station, and
    one of the base stations, which initially receives an area update request from a mobile station joining a tracking area, performs the mobility management function for the mobile station within the tracking area.

12. A central controller of a mobile communications system having at least one mobile station and a plurality of base stations, comprising:
    a receiver for receiving a notification about a load state of each of the plurality of base stations; and
    a determination section for determining whether a mobility management function of performing location management of a mobile station, which is in an idle state of not carrying out communication, is transferred from a single base station to another base station, depending on a request from one of the single base station and the other base station and a load state of at least one base station, wherein each respective base station monitors a load state of at least the respective base station, and
    one of the base station, which initially receives an area update request from a mobile station joining a tracking area, performs the mobility management function for the mobile station within the tracking area.

13. A base station of a mobile communications system having at least one mobile station and a plurality of base stations, comprising:
    a mobile manager performing mobility management of mobile stations;
    a load detector for detecting a load state of the base station; and
    a determination section for determining whether a mobility management function of performing location management of a mobile station, which is in an idle state of not carrying out communication, is transferred to another base station, depending on a request from one of the base station and the other base station to the other of the base station and the other base station and the load state of the base station,
    wherein each respective base station of the mobile communications system monitors a load state of at least the respective base station, and
    the base station, which initially receives an area update request from a mobile station joining a tracking area, performs the mobility management function for the mobile station within the tracking area.

14. The base station according to claim 13, further comprising:
    a load state communication section for exchanging a notification of the load state with a mobile manager of another base station,
    wherein the determination section determines whether the mobility management function of the mobile station is transferred to another base station, taking into account the load state of the base station and the load state of the other base station.

15. The base station according to claim 13, wherein, when receiving a request for location management from a mobile station, the determination section determines whether the mobility management function of the mobile station is allocated to the other base station, depending on the load state of the base station and the load state of the other base station.

16. The base station according to claim 15, wherein when performing the mobility management of a mobile station, the determination section determines whether the mobility management function of the mobile station is relocated to the other base station, depending on the load state of the base station and the load state of the other base station.

17. The base station according to claim 13, wherein the load state of the base station is indicated by a use rate of location management resource.

18. The base station according to claim 13, wherein the base stations belong to at least one mobile management area, wherein the location management of a mobile station is performed for each mobile management area.

19. The base station according to claim 13, wherein the determination section has at least two load threshold values which are different from each other, and
    the determination section transmits a first message when the load state of the base station exceeds a first load threshold value and transmits a second message when the load state of the base station drops to a second load threshold value or lower.

20. The base station according to claim 19, wherein, when the load state of the base station is higher than the first load threshold value and the load state of the other base station is equal to or smaller than the second load threshold value, the mobility management function requested by the mobile station is allocated to the other base station.

21. The base station according to claim 19, wherein, when the load state of the base station is higher than the first load threshold value and the load state of the other base station is equal to or smaller than the second load threshold value, the mobility management function of the mobile station is relocated to the other base station.

22. The base station according to claim 13, wherein the determination section has at least two load threshold values which are different from each other, wherein the determination section rejects an allocation request received from another base station when the load state of the base station exceeds a first load threshold value, cannot reject an allocation or reallocation request received from another base station when the load state of the base station drops to the first load threshold value or lower, and transmits a message to stop another base station sending an allocation or relocation request when the load state of the base station is equal to or lower than the first load threshold value and is higher than the second load threshold value.

23. A mobile communications system having at least one mobile station and a plurality of base stations, wherein each respective base station has a monitor for monitoring a load state of at least the respective base station, comprising:
　a determination section for determining whether a mobility management function of performing location management of a mobile station, which is in an idle state of not carrying out communication, is transferred from a single base station to another base station, depending on a request from one of the single base station and the other base station to the other of the single base station and the other base station and the load state of at least one base station,
　wherein one of the base stations, which initially receives an area update request from a mobile station joining a tracking area, performs the mobility management function for the mobile station within the tracking area.

24. The mobile communications system according to claim 23, wherein the single base station has a receiver for receiving a load state of at least one other base station, wherein the determination section determines whether the mobility management function is transferred from the single base station to the other base station, depending on the load state of the single base station and the load state of said at least one other base station.

25. The mobile communications system according to claim 23, wherein the single base station is a base station from which the mobile station has requested location management.

26. The mobile communications system according to claim 23, wherein after starting location management of the mobile station, the single base station determines whether the mobility management of the mobile station is relocated to another base station, depending on the load state of the single base station and a load state of at least one other base station.

27. The mobile communications system according to claim 23, wherein the plurality of base stations is divided into a plurality of mobile management areas, wherein the location management of a mobile station is performed for each of the plurality of mobile management areas, the mobile communications system further comprising:
　a gateway for communicating with a single base station having a mobile management function for a mobile station among a plurality of base stations within a single mobile management area; and
　a mobile management controller for determining whether the mobility management function is transferred to the other base station, depending on the load state of the single base station having the mobile management function for at least one mobile station within the single mobile management area.

28. The mobile communications system according to claim 27, wherein the mobile management controller is provided in each of the plurality of base stations.

29. The mobile communications system according to claim 28, wherein the plurality of base stations within the single mobile management area are assigned a predetermined number of temporary unique numbers used for location management of mobile stations within the single mobile management area, wherein a base station which becomes a mobile management serving subject assigns a single temporary unique number to a single mobile station.

30. The mobile communications system according to claim 29, wherein, when the mobile-management serving subject has been transferred to the other base station within the single mobile management area, the other base station that newly becomes a mobile-management serving subject assigns a new single temporary unique number to the single mobile station.

31. A mobile station of a mobile communications system having a plurality of base stations, the mobile communications system having a monitor for monitoring a load state of at least one base station, and a determination section for determining whether a mobility management function of performing location management of the mobile station, which is in an idle state of not carrying out communication, is transferred from a single base station to another base station, depending on a request from one of the single base station and the other base station to the other of the single base station and the other base station, and the load state of the at least one base station,
　wherein each respective base station monitors a load state of at least the respective base station,
　one of the base stations, which initially receives an area update request from the mobile station when the mobile station joins a tracking area, performs the mobility management function for the mobile station within the tracking area, and
　when a base station having the mobile management function for the mobile station is changed in a state of no data to be transmitted or received, a temporary unique number for location management is changed from one assigned by a before-change base station to another one assigned by an after-change base station.

32. A computer-executable program tangibly embodied on a computer readable non-transitory storage medium instructing a computer processor of a base station to perform mobility management control in a mobile communications system, comprising:
　a) monitoring a load state of the base station, and performing, by the base station that initially receives an area update request from a mobile station joining a tracking area, a mobility management function of performing location management for the mobile station within the tracking area; and
　b) determining whether the mobility management function of performing location management of the mobile station, which is in an idle state of not carrying out communication, is transferred from the base station to another base station, depending on a request from one of the base station and the other base station to the other of the base station and the other base station, and on the load state of the base station.

33. The computer-executable program according to claim 32, wherein the base station receives a load state of at least one other base station, wherein the b) is performed depending on the load state of the base station and the load state of said at least one other base station.

34. The computer-executable program according to claim 32, wherein the base station is a base station from which the mobile station has requested location management.

35. The computer-executable program according to claim 32, further comprising:
   performing mobility management of tracking the location of the mobile station.

* * * * *